US012571233B2

(12) United States Patent
Viklund

(10) Patent No.: US 12,571,233 B2
(45) Date of Patent: Mar. 10, 2026

(54) INVERTED BLOCKER RACK AND PINION

(71) Applicant: dormakaba USA Inc., Indianapolis, IN (US)

(72) Inventor: Michael Hans Viklund, Indianapolis, IN (US)

(73) Assignee: dormakaba USA Inc., Indianapolis, IN (US)

(*) Notice: Subject to any disclaimer, the term of this patent is extended or adjusted under 35 U.S.C. 154(b) by 26 days.

(21) Appl. No.: 18/224,969

(22) Filed: Jul. 21, 2023

(65) Prior Publication Data

US 2025/0027333 A1 Jan. 23, 2025

(51) Int. Cl.
*E05B 9/08* (2006.01)
*E05B 27/00* (2006.01)

(52) U.S. Cl.
CPC .......... *E05B 9/086* (2013.01); *E05B 27/0007* (2013.01); *E05B 27/0075* (2013.01)

(58) Field of Classification Search
CPC . E05B 9/04; E05B 9/041; E05B 9/084; E05B 9/086; E05B 27/0007; E05B 27/0071; E05B 27/0075
See application file for complete search history.

(56) References Cited

U.S. PATENT DOCUMENTS 2,059,678 A 11/1936 Briggs
3,485,068 A 12/1969 Bernard
3,505,842 A 4/1970 Taylor
3,599,455 A 8/1971 Pilvet
3,968,668 A 7/1976 Epstein
4,064,720 A 12/1977 Fry
4,424,693 A * 1/1984 Best ........................ E05B 9/084 70/369
4,715,201 A 12/1987 Craig
4,953,373 A * 9/1990 Toledano ................ E05B 9/084 70/369
5,070,715 A 12/1991 Smallegan et al.
(Continued)

FOREIGN PATENT DOCUMENTS

CN 101010474 A 8/2007
CN 103459739 B 2/2016
(Continued)

OTHER PUBLICATIONS

Espacenet machine translation of DE 507106 C, generated Apr. 18, 2024. (Year: 2024).
(Continued)

*Primary Examiner* — Christopher J Boswell
(74) *Attorney, Agent, or Firm* — Faegre Drinker Biddle & Reath LLP

(57) ABSTRACT

An interchangeable lock core for use with a key and having a locked state and an unlocked state is disclosed. The lock core may include a shell, a plug, and a lock. The plug may be positioned within and rotatable relative to the shell between a first plug position and a second plug position about a longitudinal axis of the plug. The plug may include a keyway adapted to receive the key. The lock may be rotatable about a lock axis between a first wherein a rotation of the plug is restricted and a second position wherein the plug is rotatable from the first plug position to the second plug position. The lock axis may be positioned outside of an envelope of the plug.

21 Claims, 16 Drawing Sheets

(56) References Cited

U.S. PATENT DOCUMENTS

| | | | | |
|---|---|---|---|---|
| 5,479,800 | A | 1/1996 | Myers | |
| 5,615,565 | A | 4/1997 | Field | |
| 5,615,566 | A | 4/1997 | Brandt | |
| 5,752,400 | A * | 5/1998 | Kim | E05B 9/084 70/411 |
| 5,819,566 | A | 10/1998 | Eden | |
| 5,819,567 | A | 10/1998 | Eden | |
| 5,823,030 | A | 10/1998 | Theriault et al. | |
| 6,112,565 | A | 9/2000 | Aramburu | |
| 6,508,091 | B1 | 1/2003 | Donatini | |
| 6,526,791 | B2 | 3/2003 | Shvarts | |
| 6,718,807 | B2 * | 4/2004 | Andersson | E05B 9/086 70/369 |
| 6,758,074 | B1 | 7/2004 | Prunbauer | |
| 6,981,396 | B1 | 1/2006 | Kim | |
| 7,681,425 | B2 * | 3/2010 | Teixeira | E05B 19/0017 70/419 |
| 8,186,194 | B2 * | 5/2012 | Field | E05B 27/0035 70/495 |
| 8,448,485 | B1 | 5/2013 | Widen | |
| 9,587,415 | B2 * | 3/2017 | Walls | E05B 27/0053 |
| 10,125,519 | B1 | 11/2018 | Gengler et al. | |
| 12,077,984 | B2 * | 9/2024 | Clifford | E05B 27/006 |
| 2002/0104346 | A1 | 8/2002 | Field et al. | |
| 2003/0024287 | A1 | 2/2003 | Field et al. | |
| 2005/0016234 | A1 | 1/2005 | Strader et al. | |
| 2005/0061043 | A1 | 3/2005 | Widen | |
| 2005/0172688 | A1 | 8/2005 | Widen | |
| 2006/0230797 | A1 | 10/2006 | Strong et al. | |
| 2007/0051146 | A1 | 3/2007 | Recondo Carayalde et al. | |
| 2008/0078224 | A1 | 4/2008 | Wheatland et al. | |
| 2008/0223097 | A1 | 9/2008 | Field et al. | |
| 2008/0236224 | A1 | 10/2008 | Chong | |
| 2008/0250830 | A1 | 10/2008 | Field et al. | |
| 2008/0264127 | A1 | 10/2008 | Chiang et al. | |
| 2008/0307841 | A1 | 12/2008 | Huang et al. | |
| 2009/0078012 | A1 | 3/2009 | Huang et al. | |
| 2009/0165514 | A1 | 7/2009 | Fredriksson et al. | |
| 2009/0241620 | A1 | 10/2009 | Field et al. | |
| 2010/0031716 | A1 | 2/2010 | Teixeira | |
| 2010/0083718 | A1 | 4/2010 | Miyake | |
| 2010/0101288 | A1 | 4/2010 | Huang et al. | |
| 2011/0252846 | A1 | 10/2011 | Hertel et al. | |
| 2012/0240645 | A1 | 9/2012 | Mathachan | |
| 2012/0240646 | A1 | 9/2012 | Herrmann | |
| 2012/0247163 | A1 | 10/2012 | Damikolas | |
| 2013/0086957 | A1 | 4/2013 | Emory | |
| 2013/0086958 | A1 | 4/2013 | Emory | |
| 2014/0190223 | A1 | 7/2014 | Field et al. | |
| 2014/0223977 | A1 | 8/2014 | Wu et al. | |
| 2015/0240525 | A1 | 8/2015 | Walls et al. | |
| 2016/0376815 | A1 | 12/2016 | Baver | |
| 2017/0081880 | A1 | 3/2017 | Artsiely | |
| 2018/0355642 | A1 | 12/2018 | Cumbo et al. | |
| 2020/0190855 | A1 | 6/2020 | Lai | |
| 2023/0082003 | A1 | 3/2023 | Clifford et al. | |
| 2024/0159081 | A1 | 5/2024 | Clifford et al. | |
| 2025/0059797 | A1 | 2/2025 | Viklund | |
| 2025/0207431 | A1 | 6/2025 | Clifford et al. | |

FOREIGN PATENT DOCUMENTS

| | | | |
|---|---|---|---|
| DE | 0507106 | C | 9/1930 |
| DE | 10050460 | A1 | 4/2002 |
| DE | 10208893 | C1 | 8/2003 |
| EP | 1662077 | A1 | 5/2006 |
| EP | 2700775 | A2 | 2/2014 |
| EP | 2770139 | A2 | 8/2014 |
| EP | 3366870 | A1 | 8/2018 |
| EP | 3366871 | A1 | 8/2018 |
| EP | 3375956 | A1 | 9/2018 |
| JP | 2008-267134 | A | 11/2008 |
| JP | 2011-522984 | A | 8/2011 |
| WO | 96/41929 | A1 | 12/1996 |
| WO | 97/11244 | A1 | 3/1997 |
| WO | 99/49161 | A1 | 9/1999 |
| WO | 2009/008852 | A1 | 1/2009 |
| WO | 2014/005568 | A1 | 1/2014 |
| WO | 2014/005569 | A2 | 1/2014 |
| WO | 2014/071916 | A2 | 5/2014 |
| WO | 2014/165949 | A1 | 10/2014 |
| WO | 2017/157586 | A1 | 9/2017 |
| WO | 2019/020944 | A1 | 1/2019 |
| WO | 2022/204154 | A1 | 9/2022 |

OTHER PUBLICATIONS

Espacenet machine translation of WO 96/41929 A1. (Year: 2024).

Final Office Action mailed on Dec. 3, 2024, for U.S. Appl. No. 17/475,091, pp. 28.

Non-Final Office Action mailed on Apr. 25, 2024, for U.S. Appl. No. 17/475,091, pp. 30.

Non-Final Office Action mailed on Apr. 29, 2024, for U.S. Appl. No. 18/417,294, pp. 28.

Restriction Requirement mailed on Mar. 22, 2024, for U.S. Appl. No. 17/475,091, pp. 5.

* cited by examiner

INVERTED BLOCKER RACK AND PINION

TECHNICAL FIELD

The present disclosure relates to lock cores and associated keys and, in particular, to interchangeable lock cores having an arcuate blocker.

BACKGROUND

Various examples are established in the art for providing an interchangeable lock core with blocking means to validate a key and allow for locking or unlocking of the lock core. It may be beneficial to incorporate means of validating the key in order to reduce instances of unlocking or locking of the interchangeable lock core through a key or other mechanism that has not been authorized for use with the interchangeable lock core. For example, the lock core may comprise various pins that are actuated by the key for placement into an unlocked position when the pins are properly engaged by the profile of the key. If the key profile fails to engage the pins properly, the key is not validated, and the lock core is not unlocked. In other examples, elements may be incorporated into the lock core that block the key from being inserted into the keyway unless it has an engagement feature that permits full insertion of the key and bypasses the blocking.

There remains a need for an interchangeable lock core for unlocking and/or locking a barrier having additional improvements relative to security.

SUMMARY

In embodiments, an interchangeable lock core for use with a lock device having a locked state and an unlocked state is provided.

In a first example ("Example 1"), a lock core for use with a key may include a shell, a plug positioned within and rotatable relative to the shell between a first plug position and a second plug position about a longitudinal axis of the plug, and a lock. The plug may include a keyway adapted to receive the key. The lock may be rotatable about a lock axis between a first position wherein a rotation of the plug is restricted and a second position wherein the plug may be rotatable from the first plug position to the second plug position. The lock may be rotatable within an envelope of the shell and the lock axis may be positioned outside of an envelope of the plug.

In a second example ("Example 2"), the lock core of Example 1 wherein the shell may include a passageway that receives the plug, and wherein the lock axis of the lock may be positioned within the shell.

In a third example ("Example 3"), the lock core of Example 1 wherein the shell may include an upper region having a first cylindrical portion and a first maximum lateral extent, a lower region having a second cylindrical portion with a second maximum lateral extent, and a waist having a third maximum lateral extent. The third maximum lateral extent may be less than the first maximum lateral extent and may be less than the second maximum lateral extent.

In a fourth example ("Example 4"), the lock core of Example 1 wherein the lock axis of the lock may be skewed relative to the longitudinal axis of the plug.

In a fifth example ("Example 5"), the lock core of Example 1 wherein a center plane of the lock may intersect the longitudinal axis of the plug.

In a sixth example ("Example 6"), the lock core of Example 1 wherein the plug may further include a lock passage, and the lock may be positioned in the lock passage.

In a seventh example ("Example 7"), the lock core of Example 1 wherein the lock may include a first end and a second end, and the shell may include at least one lock receiver. When the lock is in the second position, the first end and the second end of the lock may be spaced apart from the at least one lock receiver.

In an eighth example ("Example 8"), the lock core of Example 1 wherein the lock may be rotatable from the second position to a third position where a rotation of the plug is restricted.

In a ninth example ("Example 9"), the lock core of Example 8 wherein the lock may include a first end and a second end, and the shell may include at least one lock receiver. When the lock is in the first position, the first end of the lock may be received in the at least one lock receiver. When the lock is in the third position, the second end of the lock may be received in the at least one lock receiver.

In a tenth example ("Example 10"), the lock core of Example 8 may further include a front face, and when the lock is in the first position, the lock may be in a proximal-most position relative to the front face, and when the lock is in the third position, the lock may be in a distalmost position relative to the front face.

In an eleventh example ("Example 11"), the lock core of Example 1 wherein the plug may include an arcuate surface having a center of curvature, and the lock axis of the lock may intersect the center of curvature.

In a twelfth example ("Example 12"), the lock core of Example 11 wherein the lock may include an arcuate blocker, and the arcuate blocker may be supported by and rotate on the arcuate surface.

In a thirteenth example ("Example 13"), the lock core of Example 6 may further include a lock actuator positioned within the lock passage of the plug. The lock actuator may include a rack and a spring longitudinally aligned with the rack. The rack may include a receiver, one end of the spring may be received on the receiver, and another end of the spring may be received by the plug. The spring may provide a biasing force to bias the lock to the first position.

In a fourteenth example ("Example 14"), the lock core of Example 13 wherein a center plane of the lock may intersect the rack.

In a fifteenth example ("Example 15"), the lock core of Example 13 wherein the lock actuator may translate within the plug in a direction parallel to the longitudinal axis of the plug.

In a sixteenth example ("Example 16"), the lock core of Example 15 wherein translational movement of the lock actuator within the plug may cause the lock to rotate about the lock axis.

In a seventeenth example ("Example 17"), the lock core of Example 15 wherein the rack may further include gear teeth, and the lock may include a pinion that meshes with the gear teeth of the rack such that translation of the lock actuator may cause the lock to rotate about the lock axis.

In an eighteenth example ("Example 18"), the lock core of Example 16 wherein the lock may rotate from the first position against the biasing force of the spring to the second position.

In a nineteenth example ("Example 19"), the lock core of Example 1 wherein, in the first position, a rotation of the plug to the second plug position may be restricted.

In a twentieth example ("Example 20"), a lock core for use with a key may include a shell, a plug positioned within and rotatable relative to the shell between a first plug position and a second plug position about a longitudinal axis of the plug, a blocker, and a gear assembly. The plug may include a keyway adapted to receive the key. The blocker may be movable between a first position restricting rotation of the plug, a second position allowing rotation of the plug, and a third position restricting rotation of the plug. The gear assembly may be positioned within the plug and configured to cause movement of the blocker between the first position, the second position, and the third position.

In a twenty-first example ("Example 21"), a key for use with a lock core is provided. The lock core may include a shell, a lock actuator, a plug positioned within and rotatable relative to the shell between a first plug position and a second plug position about a longitudinal axis of the plug, a lock rotatable about a lock axis between a first position wherein a rotation of the plug is restricted and a second position wherein the plug is rotatable from the first plug position to the second plug position. The plug may include a keyway adapted to receive the key. The lock may be rotatable within an envelope of the shell and the lock axis may be positioned outside of an envelope of the plug. The key may include a key bow and a key shank. The key shank may include a groove along at least a portion of a side of the key shank. The groove may define a length terminating at a shoulder. The shoulder may include a profile to match a profile of the lock actuator and, upon contact of the shoulder with the lock actuator, the lock actuator may be operable to rotate the lock about the lock axis between the first position and the second position.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1A:
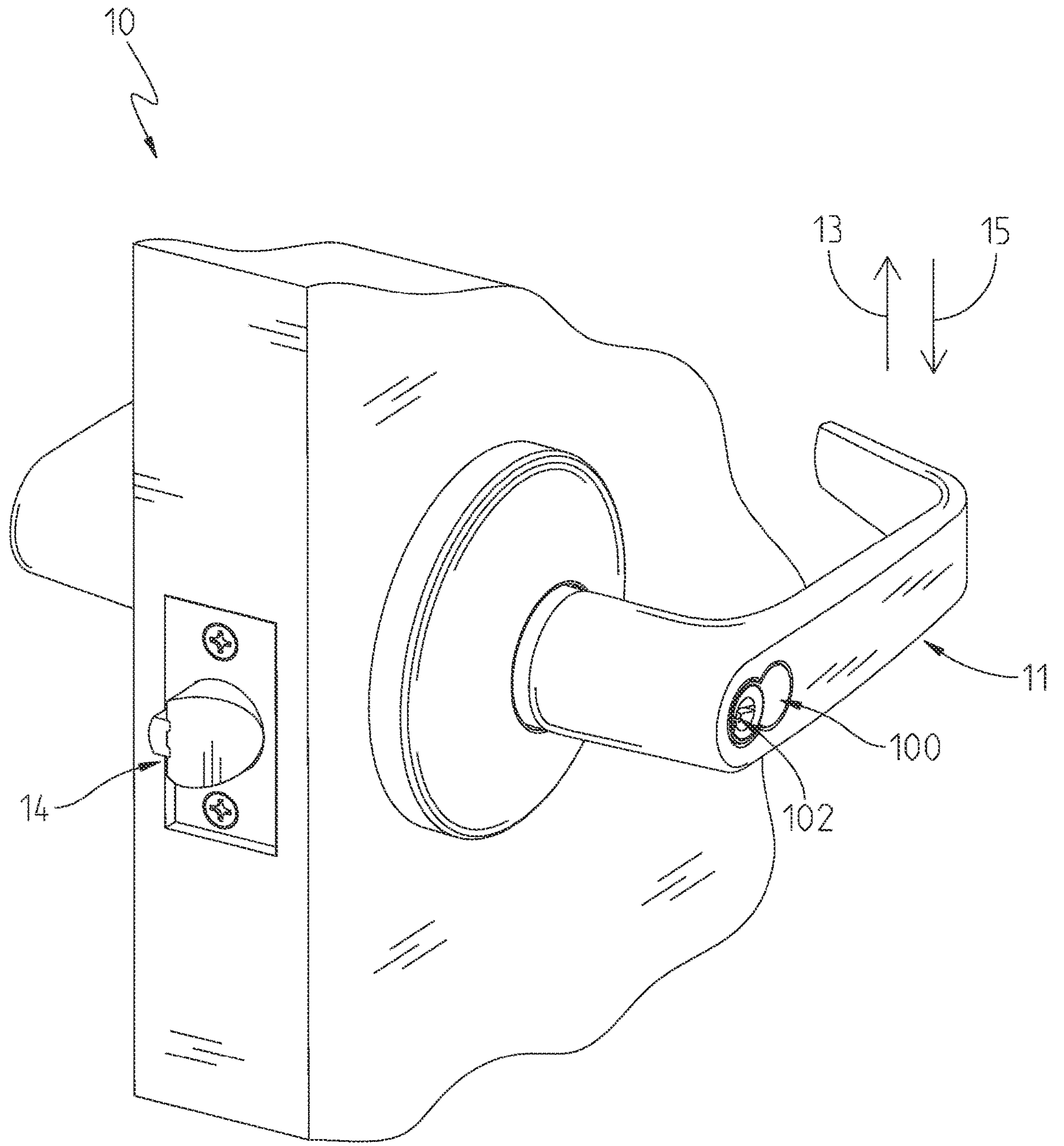
FIG. 1A is a front perspective view of a barrier with a handle having an interchangeable lock core.

For the purposes of promoting an understanding of the principles of the present disclosure, reference is now made to the embodiment illustrated in the drawings, which is described below. The embodiment disclosed herein is not intended to be exhaustive or limit the present disclosure to the precise form disclosed in the following detailed description. Rather, the embodiment is chosen and described so that others skilled in the art may utilize its teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances, throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 1B:
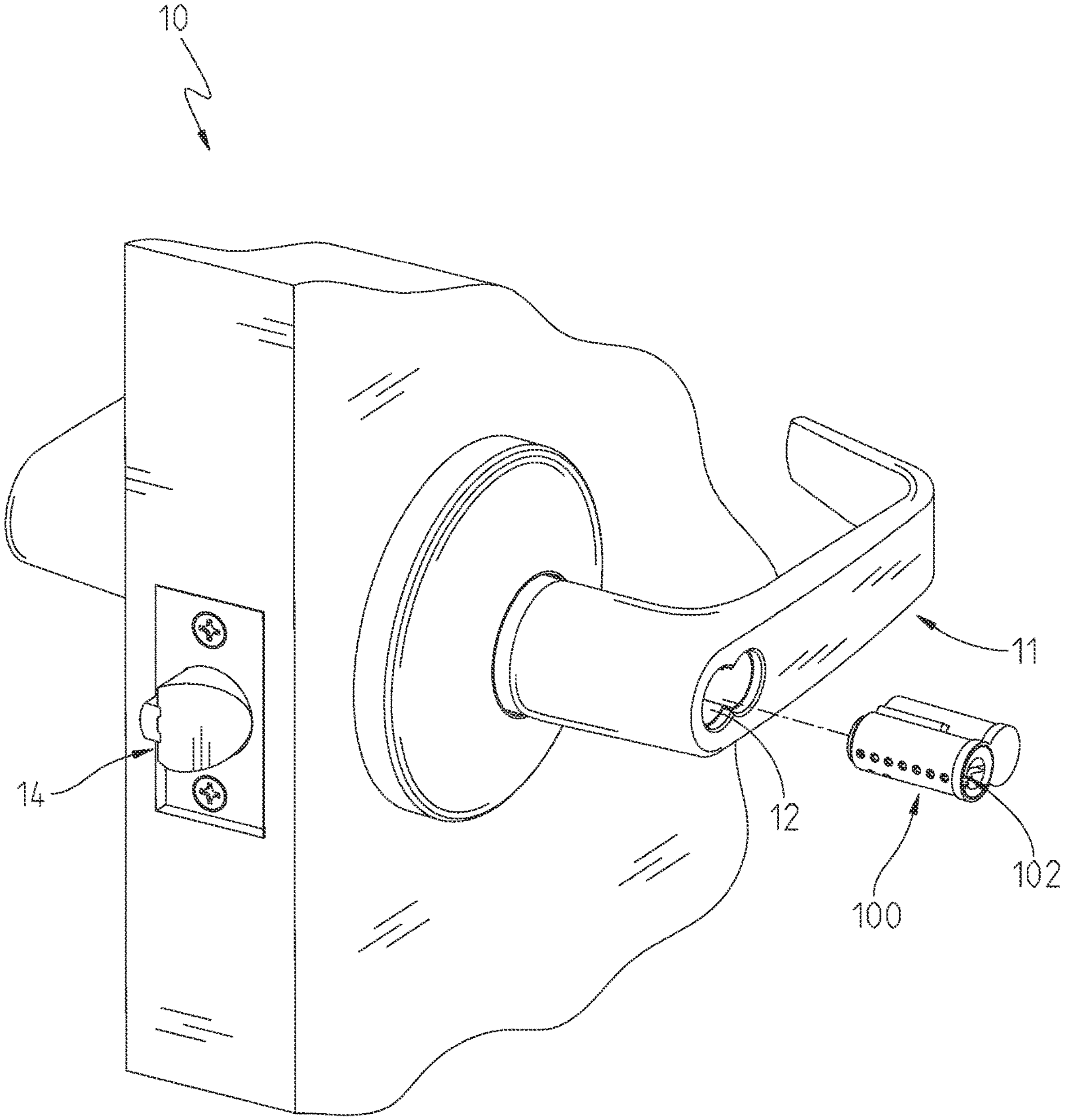
FIG. 1B is a front perspective view of the interchangeable lock core of FIG. 1A removed from the handle of FIG. 1A.

FIG. 1A illustrates a barrier in the form of door 10 comprising handle 11 having lock core 100 and retractable latch 14. In various embodiments, retractable latch 14 is retracted with the actuation of handle 11 in upward direction 13 or downward direction 15. Retractable latch 14 can be retracted through actuation of handle 11 only when handle 11 is in an unlocked configuration, which is controlled by lock core 100 being in an unlocked state. The locking or unlocking of lock core 100 may be actuated through the use of key 20 (FIG. 6) inserted into keyway 102 of lock core 100, as will be described further herein. Additionally, lock core 100 may be a small format interchangeable lock core ("SFIC"), providing the additional benefit of lock core 100 being configured to be removed and replaced in handle 11 with the use of a core keeper 119 (see FIG. 5), for example. FIG. 1B depicts lock core 100 removed from opening 12 of handle 11. In embodiments, lock core 100 may be configured as a large format interchangeable core ("LFIC"), a euro cylinder lock core, or other suitable types of lock cores.

Figure 2A:
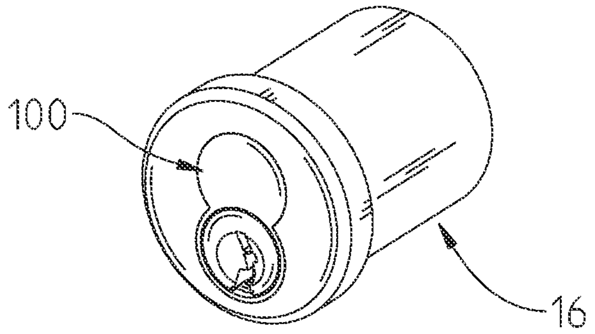
FIG. 2A is a front perspective view of the interchangeable lock core of FIG. 1A assembled with a lock cylinder.
Figure 2B:
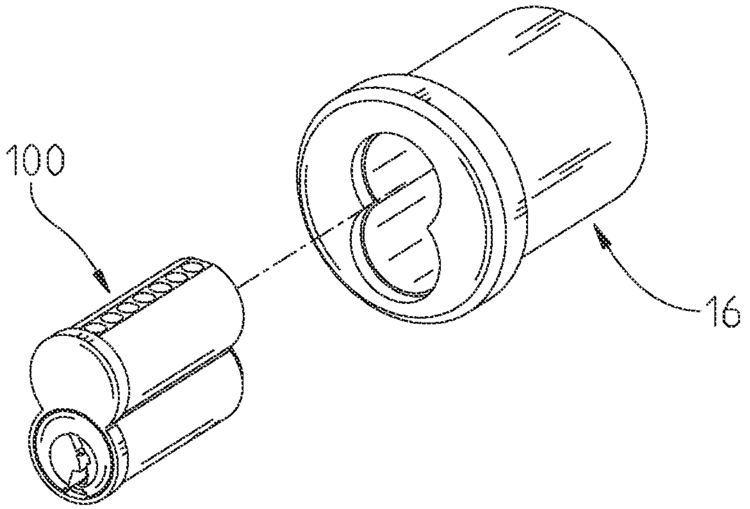
FIG. 2B is a front perspective view of the interchangeable lock core of FIG. 1A removed from the lock cylinder of FIG. 2A.
Figure 3A:
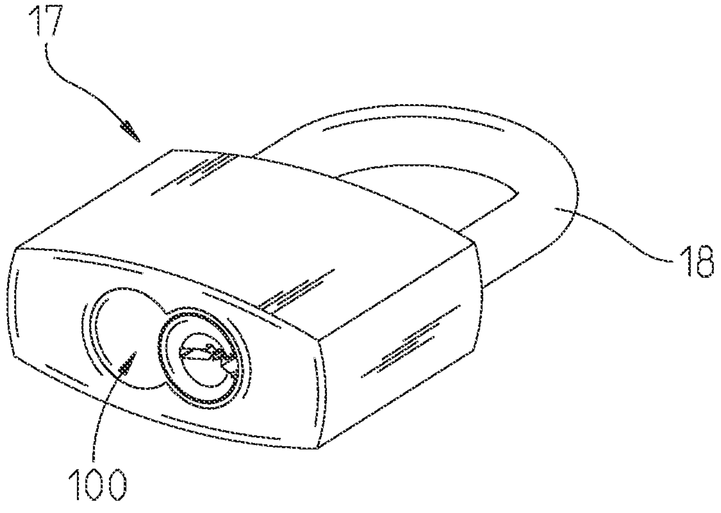
FIG. 3A is a front perspective view of the interchangeable lock core of FIG. 1A assembled with a padlock.
Figure 3B:
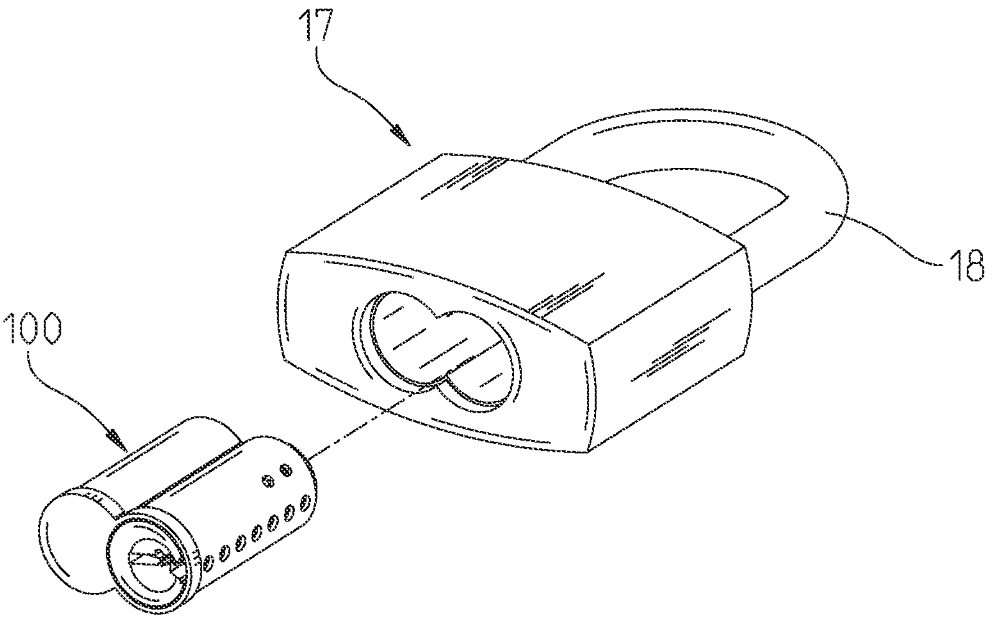
FIG. 3B is a front perspective view of the interchangeable lock core of FIG. 1A removed from the padlock of FIG. 3A.
Figure 4A:
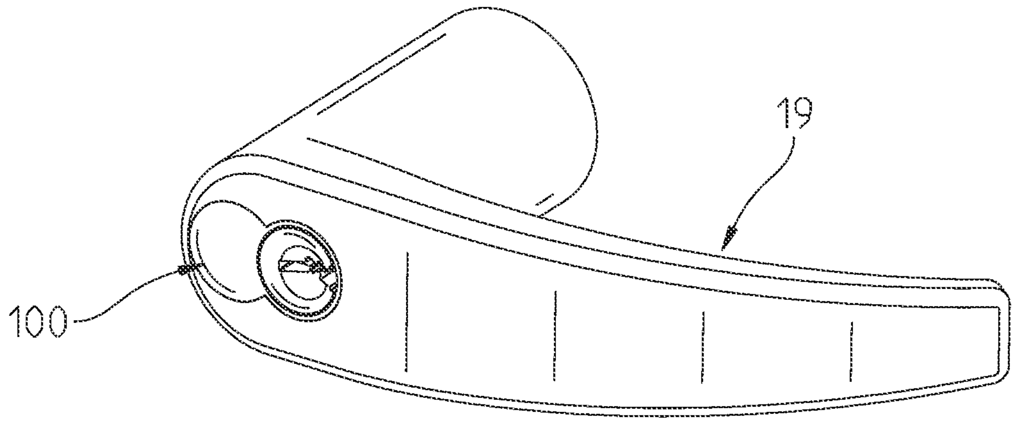
FIG. 4A is a front perspective view of the interchangeable lock core of FIG. 1A assembled with a door handle.
Figure 4B:
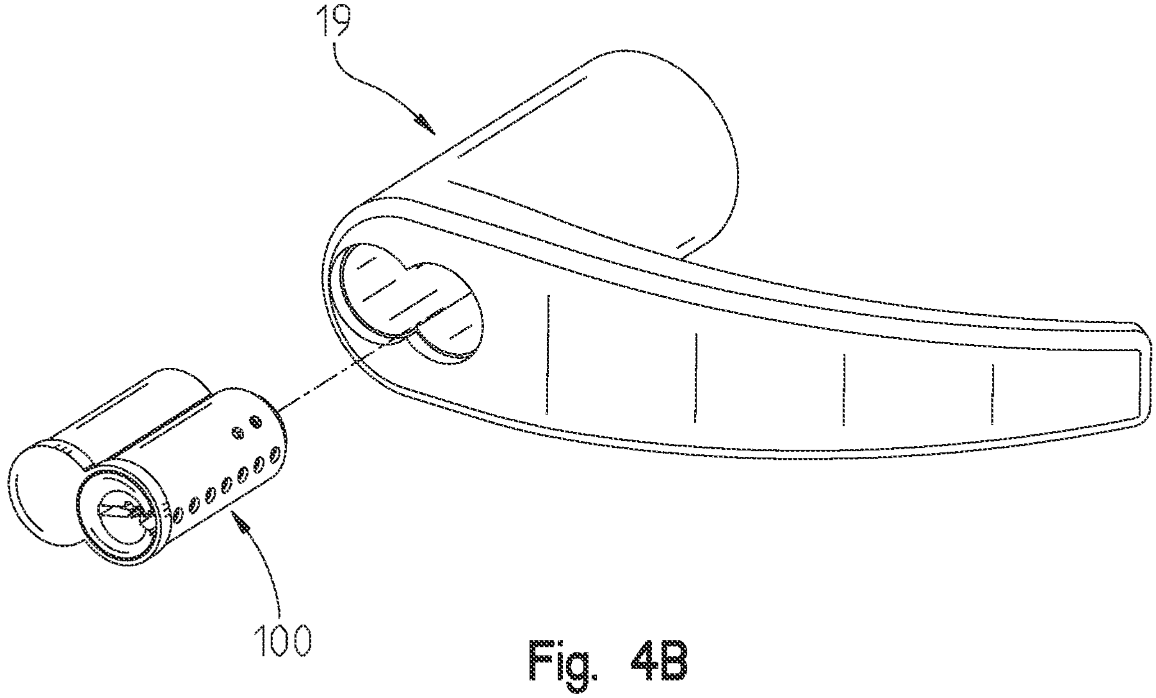
FIG. 4B is a front perspective view of the interchangeable lock core of FIG. 1A removed from the door handle of FIG. 4A.

In addition to handle 11, lock core 100 may be received in corresponding openings in a plurality of different types of housings. Referring to FIGS. 2A and 2B, for example, lock core 100 is illustratively received in and removed from an opening in lock cylinder 16. Lock cylinder 16 may be included in a mortise lock or other devices. Turning to FIGS. 3A and 3B, lock core 100 is illustratively received in and removed from an opening in a padlock 17. In the case of padlock 17, a shank 18 is received in padlock 17 and a lock device within padlock 17 locks or unlocks shank 18 to padlock 17. Referring to FIGS. 4A and 4B, lock core 100 is illustratively received in and removed from an opening in another exemplary door handle 19.

Figure 5:
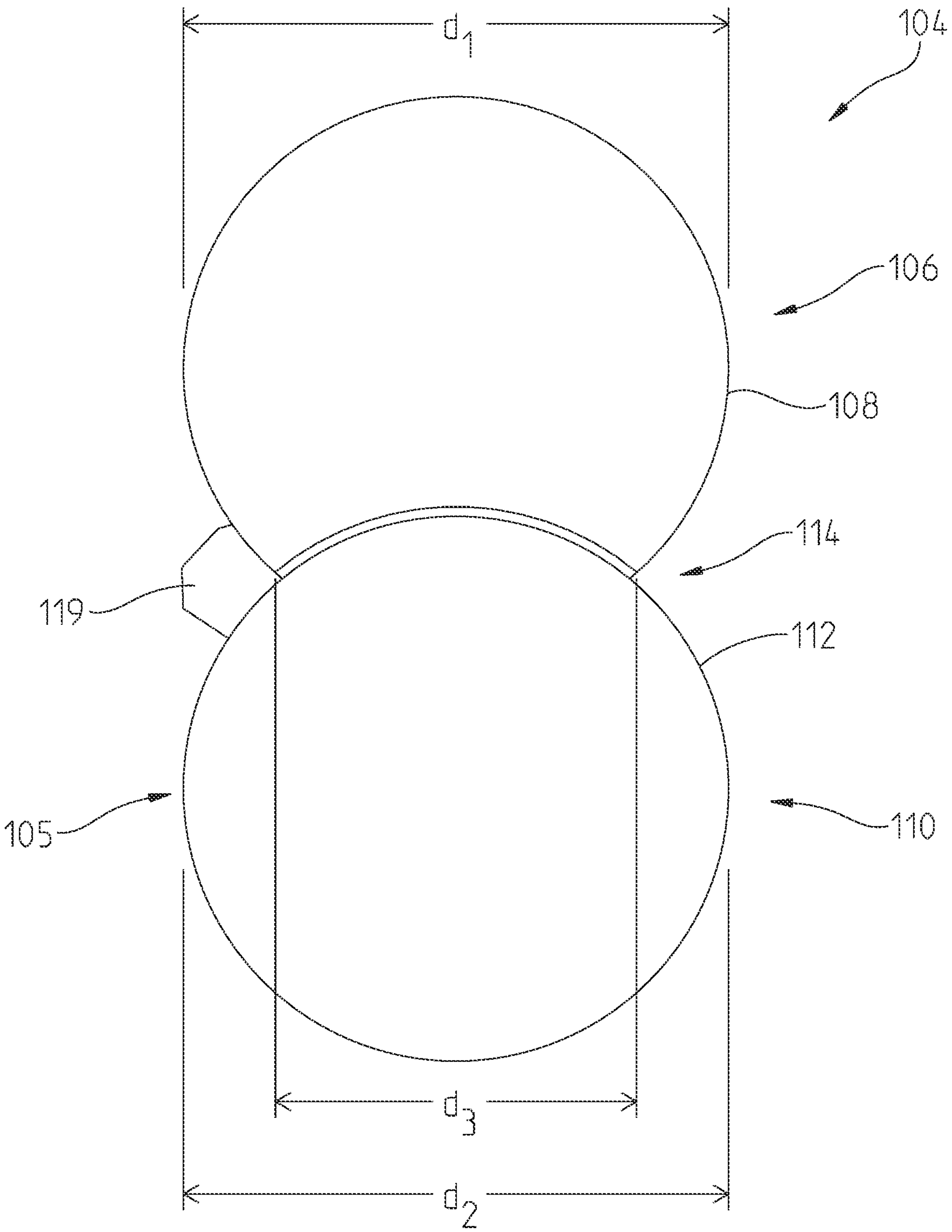
FIG. 5 is a diagrammatic view of an envelope of a lock core body of the interchangeable lock core of FIG. 1A.

Referring to FIG. 5, lock core 100 includes a lock core body 104 having an external profile or envelope 105. In the illustrated embodiment, lock core body 104 includes an upper portion 106 having a first cylindrical portion 108 with a first maximum lateral extent ($d_1$), a lower portion 110 having a second cylindrical portion 112 with a second maximum lateral extent ($d_2$), and a waist portion 114 having a third maximum lateral extent ($d_3$). The third maximum lateral extent ($d_3$) is less than the first maximum lateral extent ($d_1$) and less than the second maximum lateral extent ($d_2$). Exemplary interchangeable lock cores having a longitudinal shape satisfying the relationship of first maximum lateral extent ($d_1$), second maximum lateral extent ($d_2$), and third maximum lateral extent ($d_3$) include SFIC, LFIC, and other suitable interchangeable cores. In embodiments, lock core body 104 may have longitudinal shapes that do not satisfy the relationship of first maximum lateral extent ($d_1$), second maximum lateral extent ($d_2$), and third maximum lateral extent ($d_3$).

As will be described further with reference to FIGS. 6 and 8-11, lock core 100 may include a shell 116, a core sleeve 118, and a plug 120. Shell 116 surrounds at least a portion of core sleeve 118 and plug 120 and defines a figure eight profile which is received in a corresponding figure eight profile of face plate 122. Shell 116 includes an upper region 116A having a first cylindrical portion with a first maximum lateral extent, a lower region 116B having a second cylindrical portion with a second maximum lateral extent, and a waist 116C having a third maximum lateral extent. In various embodiments, the third maximum lateral extent is less than the first maximum lateral extent and less than the second maximum lateral extent. As illustrated, in various embodiments, core sleeve 118 includes a core keeper 119, which may extend from waist 116C of shell 116. The figure eight profile is known as an SFIC. Shell 116 may also be sized and shaped to be compatible with LFICs and other known cores.

Figure 6:
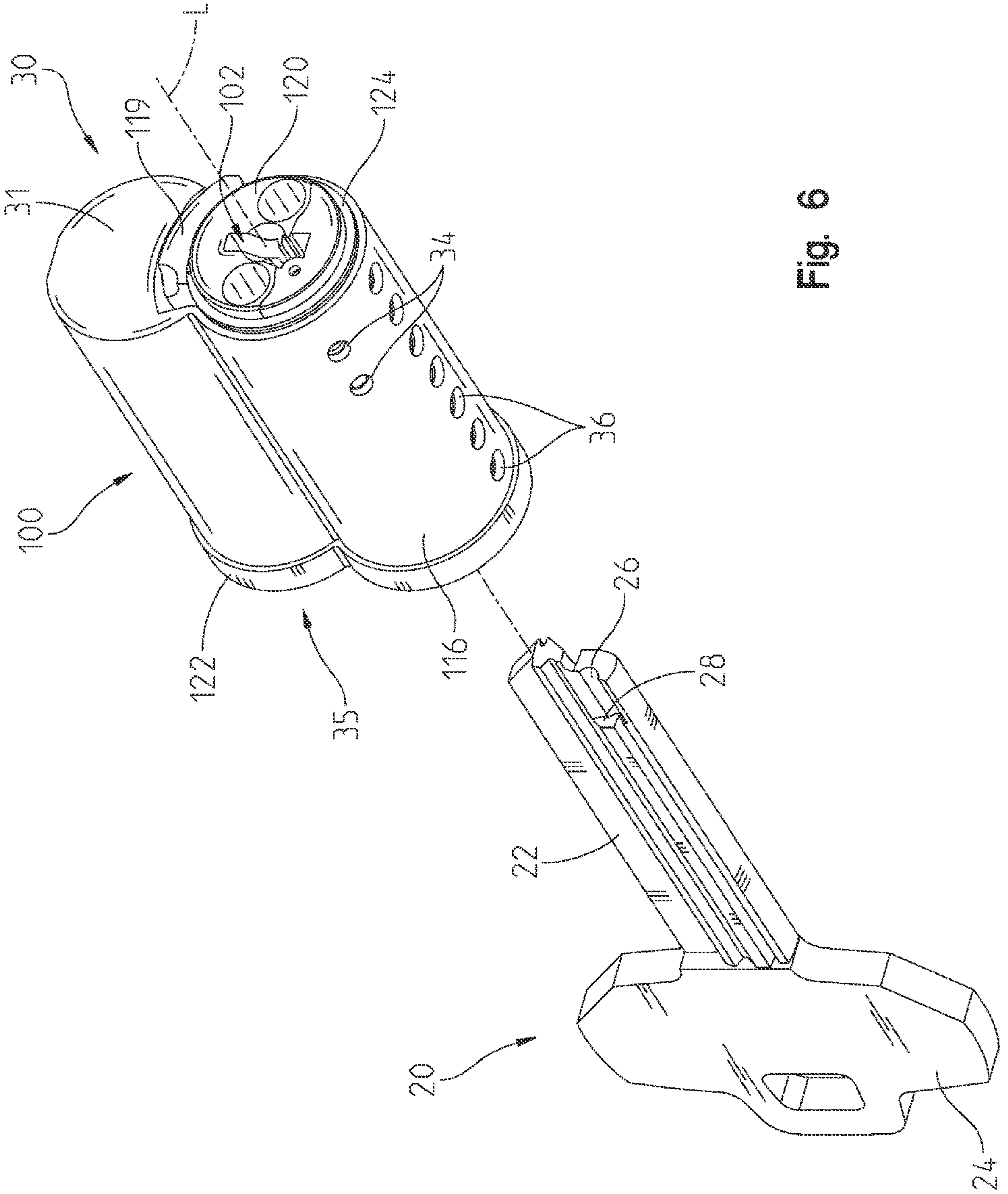
FIG. 6 is a perspective view of the interchangeable lock core of FIG. 1A and a key.
Figure 7:
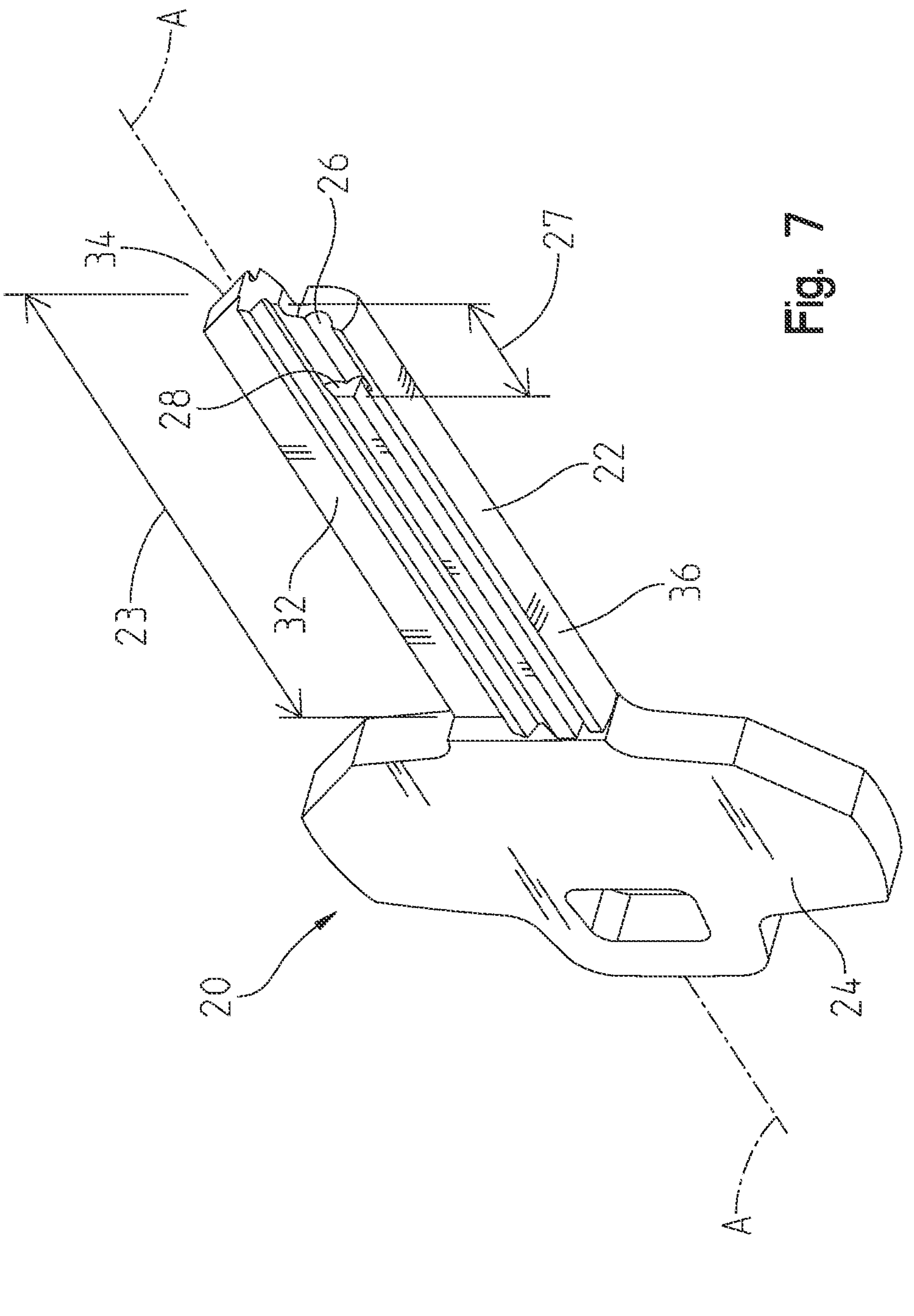
FIG. 7 is a perspective view of the key of FIG. 6.
Figure 8:
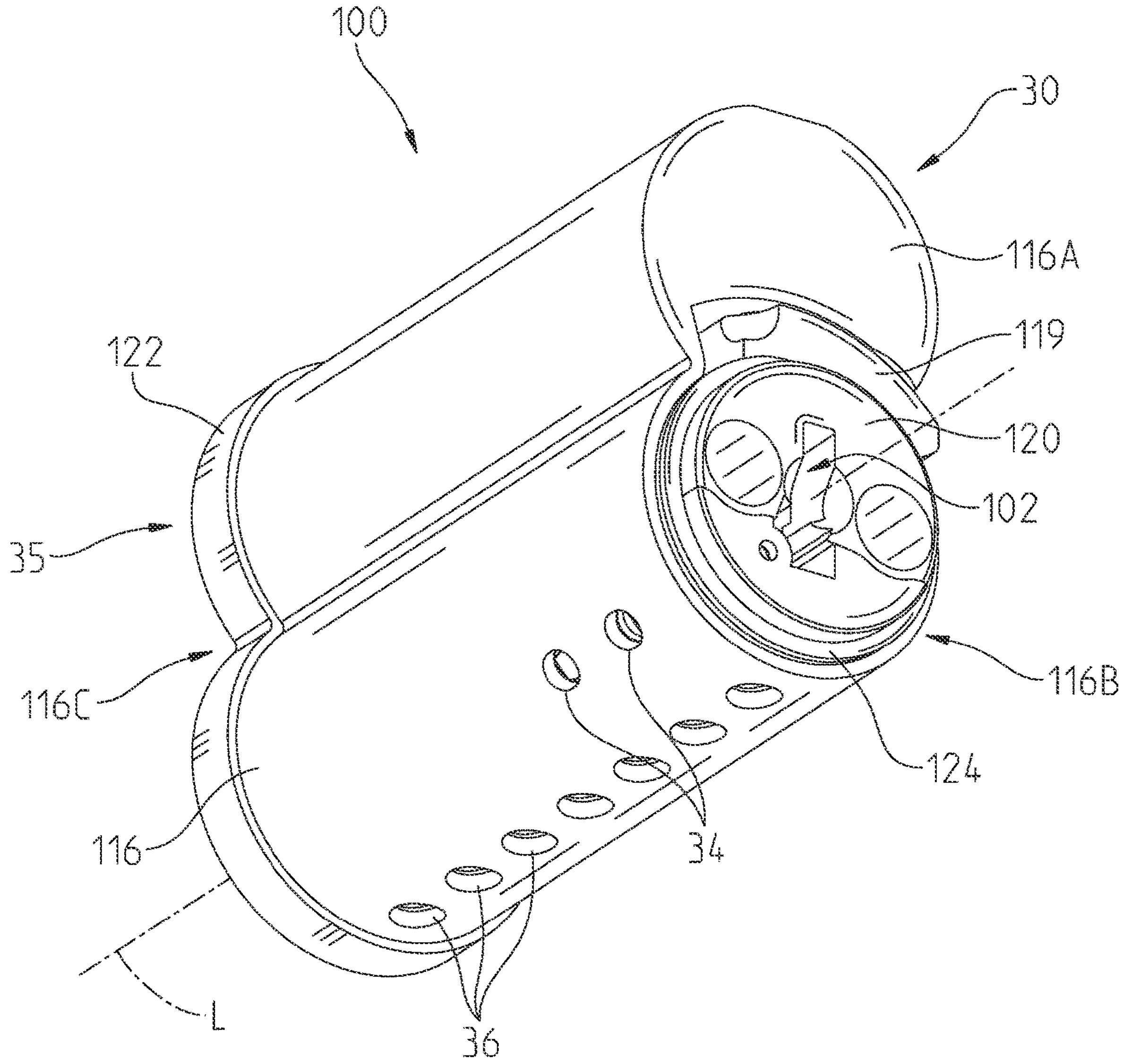
FIG. 8 is a perspective view of the interchangeable lock core of FIG. 1A.

According to the present disclosure, lock core 100 is provided with a pin tumbler assembly (not shown) including a plurality of pin tumblers (not shown) and a secondary system that verifies the access rights of a key/key blank/key body 20, illustratively shown in FIGS. 6 and 7. FIG. 6 is a bottom perspective view of lock core 100 and key 20. Key 20 is used for actuating lock core 100 from the locked state to the unlocked state and vice versa, based on insertion and actuation of key 20 as described further herein. Key 20 comprises key shank 22 and key bow 24. Key shank 22 comprises an exterior profile configured to engage with a profile of keyway 102 of lock core 100 and actuate the pin tumbler assembly. The pin tumbler assembly functions such that when the exterior profile of key shank 22 is fully engaged within keyway 102 of lock core 100, i.e., with key 20 fully inserted in keyway 102, the plurality of pin tumblers is positioned at a shear line allowing in part for lock core 100 to be in the unlocked state. More specifically, with an appropriate key 20 inserted into keyway 102, the pin tumblers no longer resist rotation of plug 120 within shell 116. In embodiments, a first key has a profile that positions the plurality of pin tumblers to allow plug 120 to rotate relative to core sleeve 118 and maintain a position of core sleeve 118 relative to lock core body 104 thereby maintaining core keeper 119 in an extended position relative to lock core body 104 and a second key has a profile that positions the plurality of pin tumblers to couple plug 120 to core sleeve 118 and allow the combination of the plug 120 and core sleeve 118 to rotate together relative to the lock core body 104 to retract core keeper 119 relative to lock core body 104 which allows lock core 100 to be removed from the lock device, such as handle 11, in which it is positioned.

As illustrated in FIGS. 6 and 7, key 20 includes key shank 22 and key bow 24. Key shank 22 includes groove 26 and shoulder 28. Key bow 24 is defined by a width extending generally transverse to longitudinal axis A that is greater than a length of key bow 24 extending along (nominally coincidental with or nominally parallel to) longitudinal axis A. Key shank 22 is defined by a width that extends generally transverse to longitudinal axis A that is less than a length 23 of key shank 22 that extends along (nominally coincidental with or nominally parallel to) longitudinal axis A. The width of key shank 22 is approximately consistent along length 23 of key shank 22. Further, key shank 22 comprises at least two sides, illustratively a right side 32 and a left side 34, a top surface, and a bottom surface 36. Right side 32 may be positioned opposite left side 34 and top surface may be positioned opposite bottom surface 36.

As depicted in FIGS. 6 and 7, an external profile has been cut into key 20, while groove 26 has been maintained in key shank 22. The external profile extends along an entirety of length 23 of key shank 22 and may be cut into key 20 through various methods, including but not limited to, milling, grinding, and other applicable machining processes. The external profile is sized and shaped to be compatible with lock core 100 such that key 20 can be inserted into lock core 100 and the exterior profile may engage with the pin tumbler assembly (not shown). The external profile is machined in such a way that groove 26 and shoulder 28 are not impeded or changed by the external profile. Groove 26 and shoulder 28 are configured such that after insertion of key 20, groove 26 is capable of receiving an element, such as lock actuator assembly 132, of lock core 100 without impeding full insertion of key 20, and shoulder 28 is capable of acting as a driver for the lock actuator assembly 132 of lock core 100, as will be described further herein with reference to FIGS. 9 and 10. In various embodiments, shoulder 28 is specifically defined by the proximal most end of the wall defining groove 26 in key shank 22. In various embodiments, for example the illustrative embodiment of FIGS. 6 and 7, each groove 26 and shoulder 28 have an arcuate or rounded cross-section. In other embodiments, the cross-section of groove 26 may be triangular, rectangular or have an otherwise irregular shape. The cross-sectional shape of groove 26 may be chosen to be such that it is able to engage with the corresponding portion of lock core 100, as will be described further with reference to FIGS. 9 and 10. In further embodiments, shoulder 28 may be a relative pocket within groove 26 rather than the proximal most surface of groove 26.

Groove 26 has length 27 along key shank 22 that extends only part of the length 23 of key shank 22, such that length 27 of groove 26 is less than length 23 of key shank 22. Length 27 of groove 26 extends along (nominally coincidental with or nominally parallel to) longitudinal axis A of key shank 22. For example, length 27 may have a value that is 50% of length 23 of key shank 22. In various other embodiments, length 27 may have a value that is 55%, 60%, 65%, 70%, or 75% of length 23 of key shank 22. In further embodiments, length 27 may be between 80% and 95% of length 23. In some embodiments, length 27 of groove 26 has a value that is 20%, 25%, or 30% of length 23 of key shank 22. The above-described percentages are non-limiting examples of dimensions of length 27, and a variety of other dimensions may be used for length 27 of groove 26. For example, length 27 may have a value of between 10% to 90% of length 27.

Groove 26 may be formed through various methods, such as, but not limited to, 3-D printing, end-milling, or side-milling. Groove 26 may be formed with a cutting tool that is configured for creating nominal flats. For example, in various embodiments, groove 26 is formed through engaging at least one side of key shank 22 with a cutting tool, for example an end mill, the cutting tool oriented transverse to longitudinal axis A of key shank 22. The cutting tool engages at least one side of key shank 22 and moves along key shank 22 while maintaining engagement. In these embodiments, the cutting tool removes material from key shank 22 at the points of engagement or contact with key shank 22. In these embodiments, for example wherein the end mill is used, a flat may be formed along a back surface of groove 26. As the end mill is moved along longitudinal axis A, nominal flats may be formed along top and bottom surfaces of groove 26, thus creating the intersecting nominal flats defining groove 26. In various embodiments, the cutting tool may be oriented nominally parallel to longitudinal axis A. Additionally, the shape of groove 26 may be governed by the shape of an end portion of the cutting tool that is engaged with key shank 22. The cutting tool is extended along key shank 22 for a length that defines length 27 of groove 26. In this way, length 27 of groove 26 along longitudinal axis A can be varied and customized to a desired length that will allow for compatibility with lock core 100, and the shape of cross-sectional groove 26 can be varied through variations in the cutting tool.

While groove 26 is generally continuous through length 27 of groove 26, there may be a pocket, barrier, shoulder or indent within groove 26. The shape and length 27 of groove 26 is manufactured for proper engagement with the lock actuator assembly 132 of lock core 100, as will be described further with reference to FIGS. 9 and 10. While shoulder 28 is illustrated in at least FIGS. 6 and 7 as having a generally flat surface shape, shoulder 28 may vary in shape based on the method of formation of groove 26 and shoulder 28. For example, the surface of shoulder 28 may be generally arcuate or curved. While the shape or configuration of shoulder 28 may vary, shoulder 28 must be configured to act as a driver for the lock actuator assembly 132 of lock core 100 such that the lock actuator assembly 132 does not move relative to key 20 once in contact with shoulder 28, as will be described further with reference to FIGS. 9 and 10.

As illustrated in FIGS. 6 and 8-11, lock core 100 is elongate along longitudinal axis L between distal end 30 and proximal end 35. Lock core 100 includes a rear surface 31 at distal end 30 and a front surface 33 at proximal end 35. Lock core 100 features shell 116, core sleeve 118, plug 120, face plate 122, and core clip 124. Shell 116 includes a bottom surface having a lock receiver 34 for receiving a lock, exemplified as arcuate blocker, i.e., pinion 126, of lock core 100 and a plurality of openings 36 for receiving the pin tumbler assembly (not shown) which are ultimately received in corresponding holes of a bible 121 (see FIG. 9) of core sleeve 118, corresponding holes of upper portion 106 of lock core body 104 (see FIG. 9), and corresponding holes in an upper side of plug 120. In the illustrated embodiment, two openings in shell 116 define the lock receiver 34. In embodiments, a single opening or channel may serve as the lock receiver for the lock 126. As described previously, the pin tumbler assembly is configured such that when key 20 is fully engaged within keyway 102, the pin tumblers are actuated to be positioned at a shear line allowing plug 120 to be rotated within shell 116 from a first position to a second position of plug 120. Core sleeve 118 may also comprise lock receiver 38 (FIGS. 10 and 13-15) for receiving lock 126 of lock core 100 such that lock 126 may extend through lock receiver 38 of core sleeve 118 and lock receiver 34 of shell 116. Plug 120 is positioned within shell 116 and is rotatable relative to shell 116 between the first position and the second position about longitudinal axis L, i.e., between a locked position preventing rotation of handle 11 (FIG. 1) to actuate retractable latch 14 and an unlocked position allowing rotation of handle 11, to actuate retractable latch 14 to allow ingress and egress through door 10. In embodiments, a lock member (not shown) of handle 11 is operatively coupled to openings 123 on a rear end of plug 120. Face plate 122 is positioned at proximal end 35 of lock core 100 and is flush with shell 116 and plug 120 of lock core 100.

Figure 9:
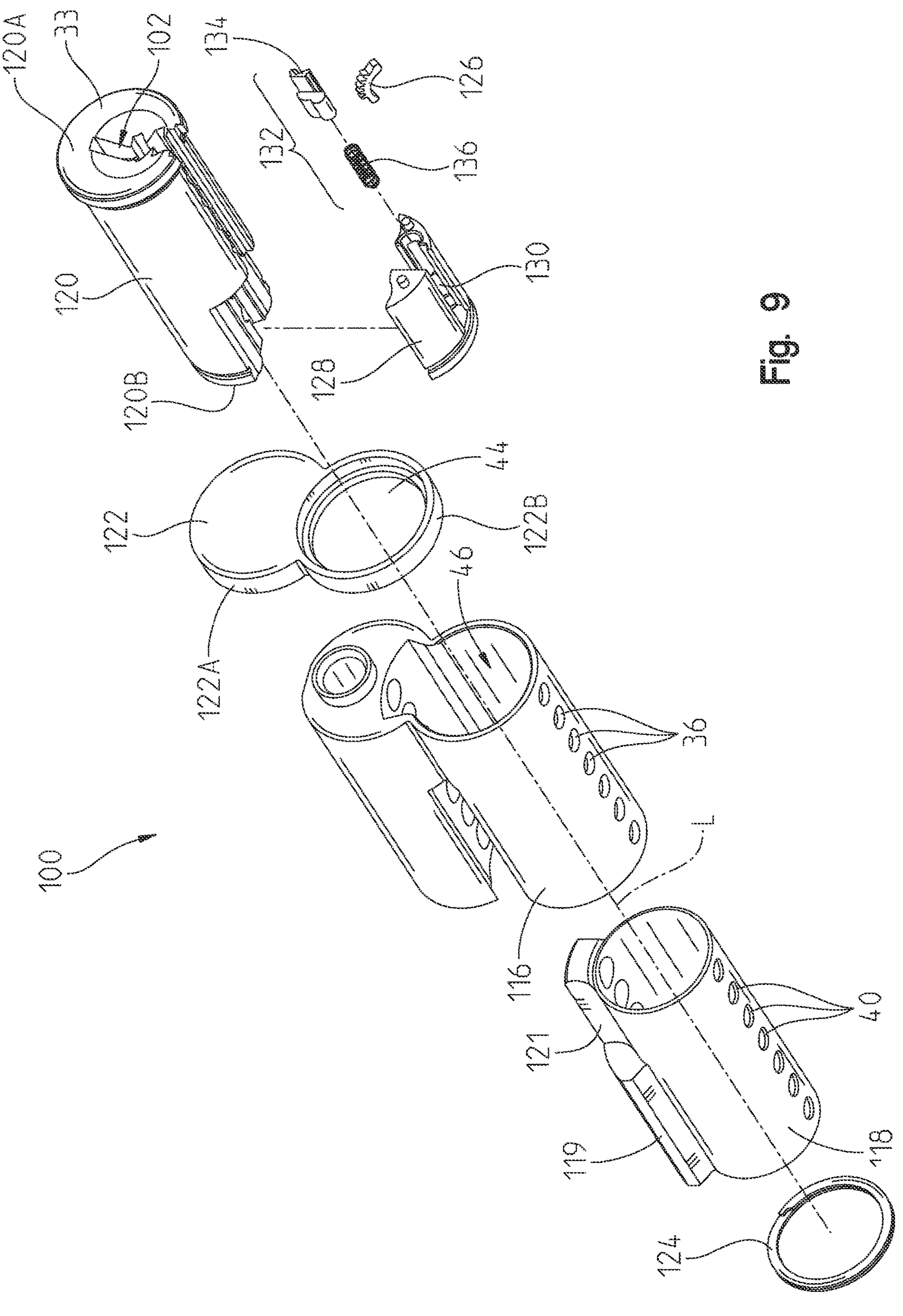
FIG. 9 is an exploded, perspective view of the interchangeable lock core of FIG. 1A.
Figure 10:
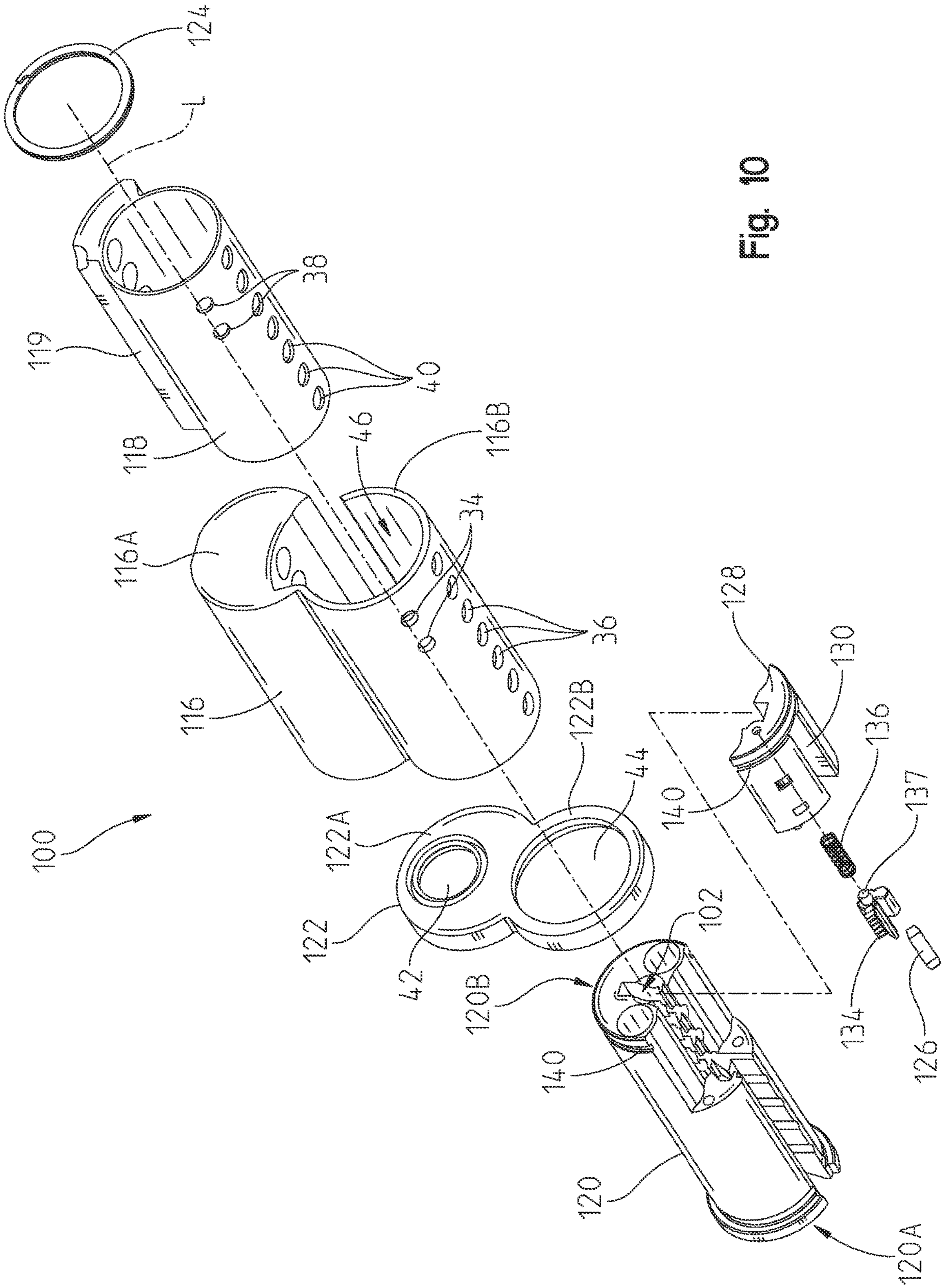
FIG. 10 is an exploded, perspective view of the interchangeable lock core of FIG. 1A.
Figure 11:
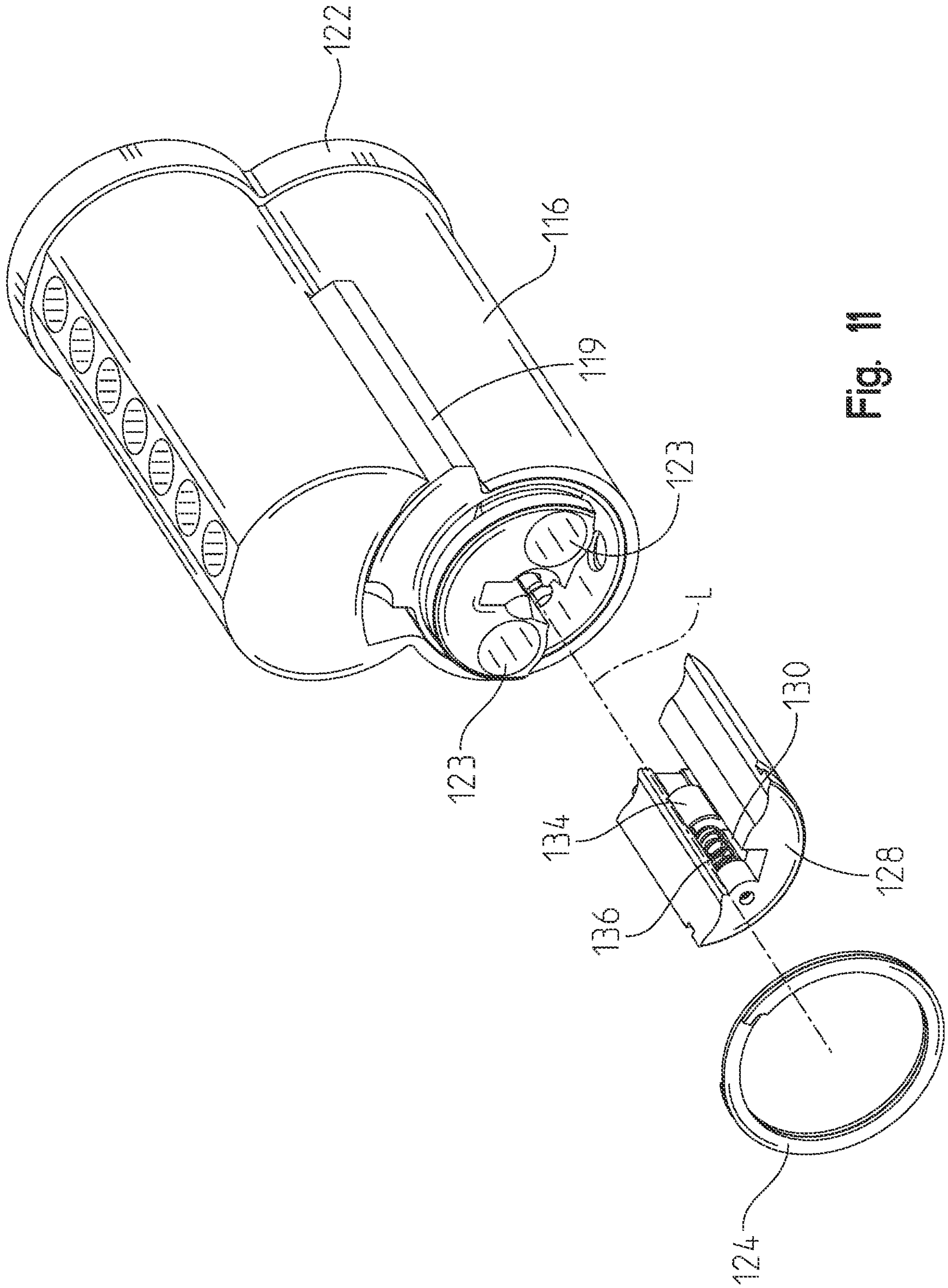
FIG. 11 is an exploded, perspective view of the interchangeable lock core of FIG. 1A.

FIGS. 9 and 10 depict an exploded view of lock core 100. Plug 120 comprises a proximal end 120A and a distal end 120B. As illustrated, plug 120 includes keyway 102 and a plug insert 128. Although depicted as separate components in the illustrated embodiment, plug insert 128 and plug 120 may be monolithically formed as a single structure. A lock passage 130 may be formed in the plug insert 128. In embodiments wherein plug 120 and plug insert 128 are monolithically formed, lock passage 130 may be formed in plug 120. Lock passage 130 may receive the lock 126 and a lock actuator assembly 132. Lock actuator assembly 132 comprises a rack 134 and a biasing element exemplified as spring 136. While described herein as spring 136, the biasing element may include various other mechanisms for biasing rack 134. Rack 134 includes a receiver for receiving one end of the biasing element and another end of the biasing element is received by the plug insert 128. In the illustrated embodiment, the receiver is a protrusion 137 and one end of the biasing element may be received by the protrusion 137 and another end of the biasing element may be received by the plug insert 128, such as by a protrusion or recess. In embodiments, a recess may act as the receiver and one end of the biasing element may be received in the recess and another end of the biasing element may be received by the plug insert 128, such as by a protrusion or recess. Moreover, spring 136 could be repositioned relative to rack 134 such that, as rack 134 translates within lock core 100, spring 136 is expanded rather than compressed, thus still accumulating elastic restoring force. Spring 136 biases the lock actuator assembly 132 to a first locked position wherein a portion of the lock 126 is received in the lock receiver 34 of the shell 116 and the lock receiver 38 of the core sleeve 118, which aligns with the lock receiver 34 of shell 116.

Figure 13:
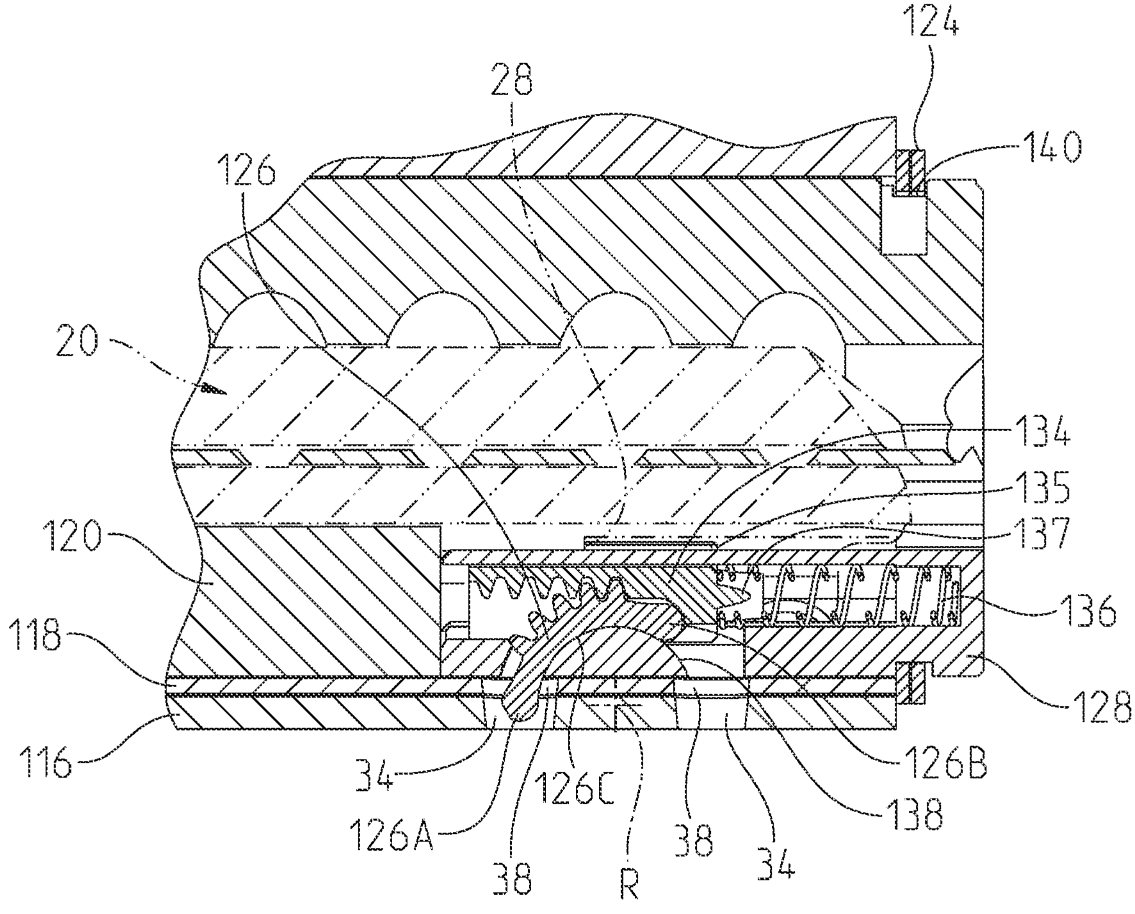
FIG. 13 is a partial cross-sectional view of the interchangeable lock core of FIG. 1A in a first configuration.
Figure 14:
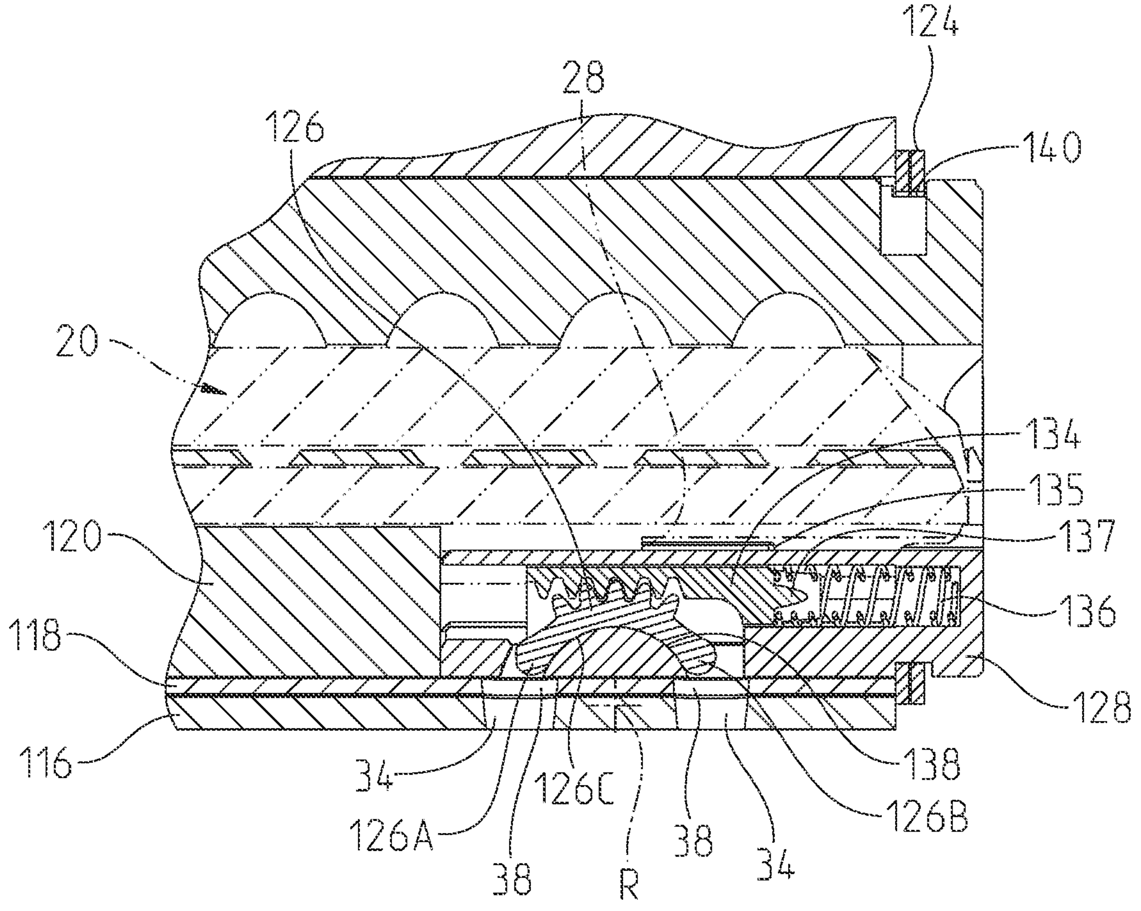
FIG. 14 is a partial cross-sectional view of the interchangeable lock core of FIG. 1A in a second configuration.
Figure 15:
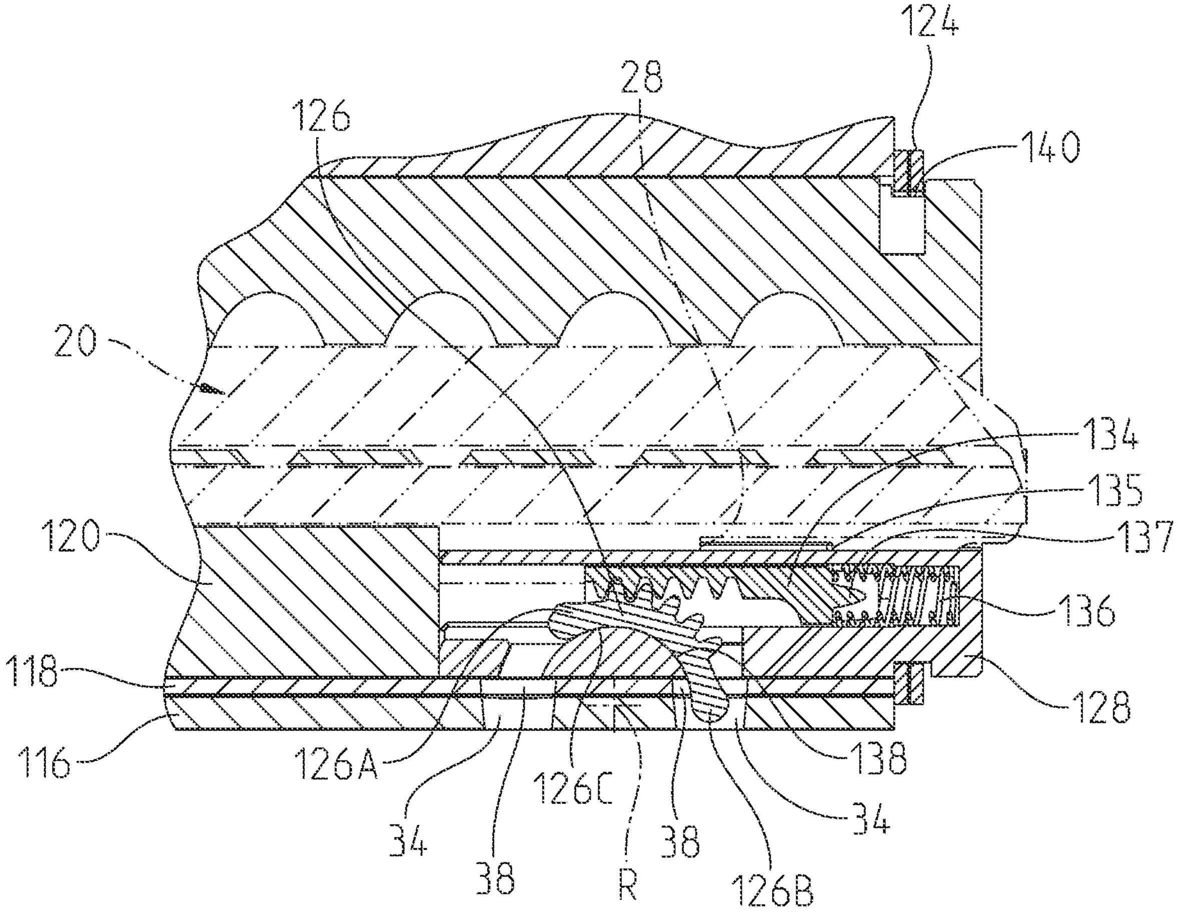
FIG. 15 is a partial cross-sectional view of the interchangeable lock core of FIG. 1A in a third configuration.
Figure 16:
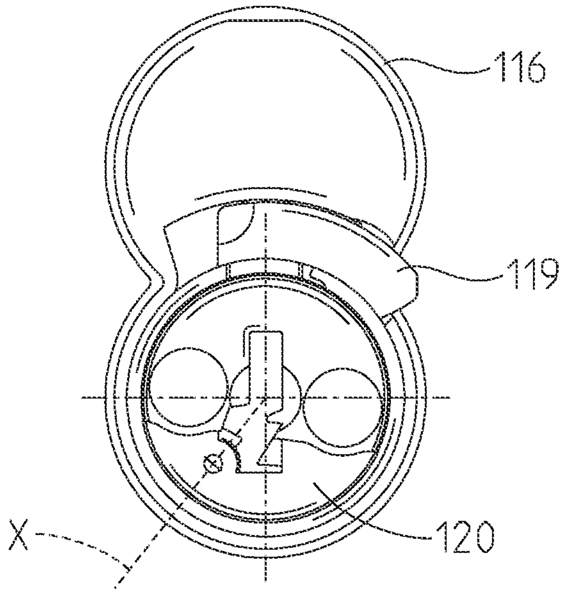
FIG. 16 is a front elevation view of the interchangeable lock core of FIG. 1A.

As best shown in FIGS. 13-15, lock 126 is an arcuate blocker or pinion that meshes with gear teeth of rack 134. In embodiments, the center plane X of lock 126 may intersect rack 134, which may result in improved meshing of the gear teeth of rack 134 with lock 126 and may reduce the size of the lock core 100, an important design consideration, among others, for SFIC. Lock 126 includes a first end 126A, a second end 126B, and a bottom surface 126C extending between first end 126A and second end 126B. Bottom surface 126C is supported by a corresponding arcuate surface 138 of plug 120. As depicted in FIG. 16, a center plane X of lock 126 intersects the center of rotation of the plug 120. An advantage, among others, of this arrangement is it results in symmetricity of the lock 126 and plug 120 thereby preventing the plug 120 from being biased to rotate in a one direction versus another. As will be discussed in detail with reference to FIGS. 13-15, translational movement of rack 134 in a direction parallel to the longitudinal axis L of lock core 100 may cause lock 126 to rotate on arcuate surface 138 of plug 120 about a lock axis R that extends perpendicularly or transverse to the longitudinal axis L of lock core 100. Arcuate surface 138 has a center of curvature, and lock axis R may intersect the center of curvature of arcuate surface 138. As shown, lock axis R is positioned outside of an envelope of plug 120, outside of an envelope of control sleeve 118, and within an envelope of shell 116. In embodiments, lock axis R is positioned outside of one or more of each of an envelope of plug 120, an envelope of control sleeve 118, and an envelope of shell 116. In embodiments, lock axis R is positioned outside of each of an envelope of plug 120, an envelope of control sleeve 118, and an envelope of shell 116. In embodiments, lock axis R is positioned outside of an envelope of plug 120, within an envelope of control sleeve 118, and within an envelope of shell 116. In embodiments, lock axis R intersects one of an envelope of plug 120, an envelope of control sleeve 118, and an envelope of shell 116.

Lock passage 130 is configured such that upon insertion of rack 134, lock passage 130 only permits movement of rack 134 along, i.e., coincidental with or parallel to, longitudinal axis L, and prohibits movement of rack 134 in a direction transverse to longitudinal axis L. As key 20 is inserted into keyway 102, shoulder 28 of groove 26 contacts rack 134, preventing rack 134 from moving relative to key 20 and causing rack 134 to translate within lock passage 130 against the biasing force of spring 136. In the illustrated embodiment, as best depicted in FIGS. 12B and 13-15, rack 134 includes an engagement feature 135, and shoulder 28 of groove 26 of key 20 contacts the engagement feature 135 of rack 134 to cause the rack 134 to translate within lock passage 130 against the biasing force of spring 136 and to prevent rack 134 from moving relative to key 20.

Proximal end 120A of plug 120 is inserted from a rear side of shell 116 into contact with face plate 122 such that face plate 122 is coupled to and positioned at least partially around proximal end 120A of plug 120. Face plate 122 includes a figure eight shape, having an upper region 122A and lower region 122B. Upper region 122A includes a first opening 42 and lower region 122B has a second opening 44 such that plug 120 is received within second opening 44 of face plate 122. In embodiments, face plate 122 additionally comprises a counterbore such that face plate 122 and plug 120 are flush.

Core sleeve 118 is inserted over distal end 120B of plug 120 until it surrounds plug 120 and is received at least in part by face plate 122. Core sleeve 118 comprises lock receiver 38 and is positioned such that lock receiver 38 is aligned with the lock passage 130 of plug 120 such that lock 126 may extend out of lock passage 130 and into lock receiver 38 of core sleeve 118. Core sleeve 118 also comprises a plurality of openings 40 for receiving the plurality of pin tumblers of the pin tumbler assembly. In embodiments, core sleeve 118 and the plurality of pin tumblers are received in shell 116 and core sleeve 118 prior to the insertion of plug 120.

Shell 116 is inserted over core sleeve 118 and plug 120 until shell 116 abuts face plate 122. As discussed above, an outer perimeter of shell 116 comprises a figure eight shape corresponding to that of face plate 122. Lower region 116B of shell 116 includes a passageway, illustratively opening 46, for receiving and surrounding plug 120. Upper region 116A of shell 116 abuts upper region 122A of face plate 122 and lower region 116B abuts lower region 122B of face plate 122. In these embodiments, both plug 120 and shell 116 are flush with face plate 122. As previously mentioned, shell 116 includes the plurality of openings 36 for receiving the pin tumblers of the pin tumbler assembly and lock receiver 34 for receiving lock 126 of lock actuator assembly 132, as will be described further herein. When positioned over core sleeve 118 and plug 120, lock receiver 34 of shell 116 aligns with lock passage 130 of plug 120 and lock receiver 38 of core sleeve 118. The plurality of openings 36 of shell 116 align with the plurality of openings 40 of core sleeve 118. Towards distal end 30 of lock core 100, core clip 124 is received within a circumferential groove 140 of plug 120 and couples plug 120 and core sleeve 118 to shell 116.

The operation of lock core 100 in use with key 20 to unlock handle 11 (FIG. 1) of door 10 will be described herein with reference to FIGS. 13-15. For the purposes of the disclosure of FIGS. 13-15 herein, it is assumed that a plurality of pin tumblers of the pin tumbler assembly is positioned within the lock core 100 such that they allow for rotation of plug 120 within shell 116. The description of FIGS. 13-15 thus describes the operation of lock 126 and lock actuator assembly 132 for verifying key 20 as having access to unlock door 10 separate from the ability of key 20 to properly position the pin tumblers to allow for relative rotation of plug 120 within shell 116.

FIG. 13 is a cross-sectional view of lock core 100. As illustrated, one end of spring 136 is received on a protrusion 137 of rack 134 and another end of spring 136 is received by plug insert 128 of plug 120. As discussed above with reference to FIGS. 9-11, rack 134 is permitted only for movement along, i.e., coincidental with or parallel to, longitudinal axis L of lock core 100. Spring 136 is compressed between rack 134 and plug insert 128 of plug 120 throughout the translational range of motion of rack 134. As depicted in FIG. 13, as spring 136 biases rack 134 to a proximal end of lock passage 130, first end 126A of lock 126 extends into lock receiver 38 of core sleeve 118 and lock receiver 34 of shell 116. This position, the first locked position, defines one end of a range of motion of lock 126 wherein first end 126A blocks any rotation of plug 120 relative to shell 116. In this position, lock 126 is positioned further proximally relative to front surface 33 and proximal end 35 of lock core 100 than in any other position along the range of motion. Through this range of motion, lock 126 is supported by and rotates on arcuate surface 138 of plug insert 128 of plug 120.

With reference to FIGS. 13 and 14, the rack 134 as illustrated in FIG. 14 is in a space positioned from the proximal end of lock passage 130, and, as such, spring 136 has compressed against plug insert 128 of plug 120. As a result of the translational movement of rack 134 distally relative to the proximal end of lock passage 130, lock 126 has rotated about lock axis R to an intermediate position within the range of lock 126. More specifically, gear teeth of rack 134 mesh with lock 126, illustratively an arcuate blocker or pinion, and the translational movement of rack

134 causes the lock 126 to rotate about lock axis R. In this intermediate position, the unlocked position, first end 126A and second end 126B of lock 126 do not extend through lock receiver 38 of core sleeve 118 or lock receiver 34 of shell 116 and plug 120 is capable of rotation relative to shell 116.

As discussed above, lock 126 rotates about lock axis R that intersects the center of curvature of arcuate surface 138. In the illustrated embodiment, lock axis R is positioned outside of an envelope of the plug 120. For example, lock axis R may be positioned within an envelope of the shell 116. In embodiments, lock axis R may be positioned within an envelope of the core sleeve 118 or, alternatively, further outside an envelope of the shell 116. Positioning the center of rotation of the lock 126 outside of the plug 120 may allow for greater control over the motion of the lock 126 and lock actuation assembly 132.

FIG. 15 illustrates rack 134 positioned further distally from the proximal end of lock passage 130 along, i.e., coincidental with or parallel to, longitudinal axis L (spaced further from the proximal end of lock passage 130 in FIG. 15 than in FIG. 14). As a result of this further translational movement of rack 134 within lock passage 130, lock 126 has further rotated about lock axis R and is positioned further distally in FIG. 15 with respect to the proximal end of lock passage 130 than the positioning of lock 126 as shown in FIG. 14. In this position, rack 134 has further compressed spring 136 against plug insert 128 of plug 120. Additionally, in this position, the second locked position, second end 126B of lock 126 extends into lock receiver 38 of core sleeve 118 and lock receiver 34 of shell 116. Plug 120 is thus blocked from rotation relative to shell 116. The positioning illustrated in FIG. 15 defines a second extent or second end of the range of motion of lock 126 wherein lock 126 is positioned further distally with respect to proximal end 35 of lock core 100 than at any other position along the range of motion.

FIGS. 13-15 thus illustrate the range of motion of lock 126 and the elements of lock actuator assembly 132 as the components move from one end of the range of motion to the opposing end of the range of motion. Actuation of the movement will be further described herein with continued reference to FIGS. 13-15.

Figure 12B:
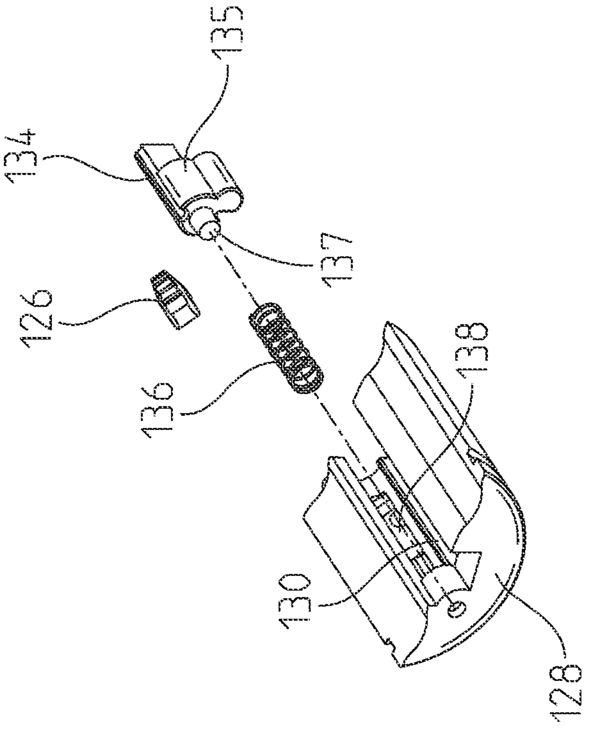
FIG. 12B is an exploded, perspective view of the plug insert of FIG. 12A.
Figure 12A:
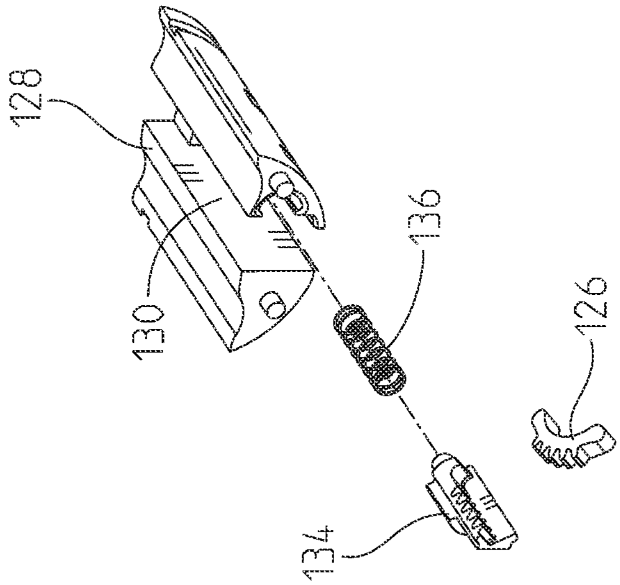
FIG. 12A is an exploded, perspective view of a plug insert of the interchangeable lock core of FIG. 1A.

As illustrated in FIGS. 13-15 in phantom, key 20 may be inserted into keyway 102 of lock core 100 to actuate lock actuator assembly 132 and, thus, lock 126 through the above-described range of motions. As previously described with reference to FIGS. 6 and 7, key shank 22 will only be verified if groove 26 and shoulder 28 comprise features that properly engage with engagement feature 135 of rack 134 and actuate rack 134 sufficiently. For example, as depicted in FIGS. 13-15, engagement feature 135 of rack 134 may extend into a portion of keyway 102 and, when inserted, groove 26 of key shank 22 must have the correct cross-sectional shape that can receive engagement feature 135 and dimensions to properly actuate rack 134. Otherwise, for example, rack 134 may compress against spring 136 to actuate lock 126 into the second locked position, as will be described further with reference to FIG. 15, or, alternatively, rack 134 may fail to compress against spring 136 sufficiently to rotate lock 126 from the first locked position to the unlocked position. Additionally, key 20 may not be properly aligned with the pin tumbler assembly, prohibiting rotation of plug 120 relative to shell 116. For example, as illustrated in FIGS. 10 and 12B, engagement feature 135 has a generally arcuate or curved cross section. Groove 26 has a cross section that is capable of receiving a portion of engagement feature 135 and, as key 20 is inserted into keyway 102, rack 134 may actuate lock 126 to an unlocked position, as will be described further with reference to FIG. 14. Various other cross-sectional shapes may be incorporated with both groove 26 and engagement feature 135 to allow for engagement.

Additionally, groove 26 requires a specific length along key shank 22 in order to engage rack 134 sufficiently for actuation of lock 126. Once rack 134 is received by groove 26 and abuts shoulder 28, key 20 may actuate rack 134 forward, thus causing lock 126 to rotate on arcuate surface 138 and about lock axis R. Rack 134 is actuated a predetermined and finite amount in order to allow for lock 126 to be in the unlocked position, as will be described further with reference to FIG. 14. As such, length 27 of groove 26 must be configured to actuate rack 134 the predetermined amount for placing lock 126 into the unlocked position. In other words, if length 27 of groove 26 is too large, even after fully inserting key 20, shoulder 28 may not engage engagement feature 135 of rack 134 and rack 134 will not be actuated. However, if length 27 of groove 26 is too small, insertion of key 20 may engage engagement feature 135 of rack 134 and actuate rack 134 too far within lock passage 130 and thus out of the unlocked position and into the second locked position. These examples will be described further herein with reference to FIGS. 13-15.

Referring again to FIG. 13, lock 126 is illustrated in a first locked position wherein key 20 has not actuated lock actuator assembly 132. Spring 136 biases lock actuator assembly 132 such that the first end 126A of lock 126 extends into lock receiver 38 of core sleeve 118 and lock receiver 34 of shell 116. With first end 126A of lock 126 extending through lock receiver 34 of shell 116, first end 126A of lock 126 blocks rotation of plug 120 relative to shell 116 such that key 20 is not operable to actuate the lock even if the pin tumblers are at the correct shear line. As such, lock 126 is in the first locked position and lock core 100 is in a locked state.

With reference still to FIG. 13, while key 20 is inserted into keyway 102, shoulder 28 of key shank 22 has not engaged with engagement feature 135 of rack 134. This may be a result of key 20 not being fully inserted into keyway 102 and/or length 27 of groove 26 being too large or otherwise shaped incorrectly to engage engagement feature 135 of rack 134. For example, as previously described with reference to FIGS. 6 and 7, groove 26 and thus shoulder 28 may comprise various cross-sectional shapes in order to engage rack 134. As illustrated in FIG. 13, groove 26 comprises a cross-section that is capable of receiving rack 134. In the positioning of FIG. 13, key 20 may not be fully inserted into lock core 100, or length 27 of groove 26 may be too large and does not allow for engagement between shoulder 28 and engagement feature 135 of rack 134. As such, shoulder 28 will not actuate rack 134 to cause rotation of lock 126 on arcuate surface 138 and about lock axis R. In this configuration, when key shank 22 has an exterior profile corresponding to the pin tumbler assembly such that it actuates pin tumblers of the pin tumbler assembly to be at a shear line, plug 120 will be prohibited from rotating to unlock handle 11 due to first end 126A of lock 126 extending into lock receiver 38 of core sleeve 118 and lock receiver 34 of shell 116 and blocking rotation of the plug 120 within shell 116.

FIG. 14 illustrates lock 126, and thus lock core 100, in the unlocked position. Lock 126 is sequentially movable from the first locked position to the unlocked position. Movement of lock 126 from the first locked position to the unlocked position is effected by insertion of key 20, shown in phantom, into keyway 102 to actuate lock actuator assembly 132. As previously described, groove 26 and thus shoulder 28 of key 20 must be sized and shaped to properly actuate rack 134 of lock actuator assembly 132. As illustrated in FIG. 14, groove 26 and shoulder 28 have a cross-section that is capable of receiving engagement feature 135 of rack 134 within groove 26 and has length 27 along key shank 22 that allows for proper engagement with rack 134 once fully inserted. As such, during insertion of key 20, shoulder 28 of groove 26 engages engagement feature 135 and actuates rack 134 against the biasing force of spring 136 in a direction along longitudinal axis L and distal relative to the proximal end 35 of lock core 100. As rack 134 is actuated against biasing force of spring 136, lock 126 rotates about lock axis R such that first end 126A no longer extends through lock receiver 38 of core sleeve 118 and lock receiver 34 of shell 116. Lock 126 rotates about lock axis R as a result of the gear teeth of rack 134 meshing with lock 126, illustratively an arcuate blocker or pinion, as rack 134 translates along the longitudinal axis L of lock core 100.

To effect movement of lock 126 from the first locked position to the unlocked position illustrated in FIG. 14, groove 26 is sized and shaped such that shoulder 28 of key 20 only actuates lock actuator assembly 132 a sufficient distance to cause lock 126 to rotate until first end 126A of lock 126 is no longer extending through lock receiver 38 of core sleeve 118 and lock receiver 34 of shell 116, and second end 126B of lock 126 does not extend through lock receiver 38 of core sleeve 118 and lock receiver 34 of shell 116. As shown in FIG. 13, this allows for lock receiver 34 of shell 116 to be uninterrupted by lock 126. As previously described, if key shank 22 comprises an exterior profile that effectively engages with the pin tumbler assembly, rotation of key bow 24 causes rotation of plug 120 within lock core 100 relative to shell 116. In this position, handle 11 is unlocked and door 10 can be opened. In various embodiments, the unlocked position is achieved with a terminal position of key 20, such that key 20 may not be inserted any further into keyway 102 of plug 120 and may only be retracted back out of the keyway 102.

In embodiments, lock 126 is sequentially movable from the unlocked position to a second locked position as illustrated in FIG. 15. The second locked position is different from the first locked position but similarly prohibits rotation of plug 120 relative to shell 116 within lock core 100. Movement of lock 126 from the unlocked position to the second locked position is a result of continued actuation of lock actuator assembly 132 wherein rack 134 is continuously actuated in a distal direction relative to proximal end 35 of lock core 100. The continued actuation of lock actuator assembly 132 may be a result of length 27 of groove 26 along key shank 22 being too small, such that rack 134 is continuously actuated after lock 126 has been positioned in the unlocked position of FIG. 14. In this position, if key bow 24 is rotated, rotation of plug 120 relative to shell 116 is blocked due to second end 126B of lock 126 extending through lock receiver 38 of core sleeve 118 and lock receiver 34 of shell 116. As such, lock 126 is in the second locked position and lock core 100 is in the locked state.

As depicted in FIGS. 13-15, movement of lock 126 from the first locked position to the unlocked position and, subsequently, from the unlocked position to the second locked position defines a sequential actuation and rotation of lock 126 about lock axis R from one end of the range of motion of lock 126 to the second end of the range of motion of lock 126. The first locked position corresponds to a proximalmost position of lock 126 relative to proximal end 35 of lock core 100 and the second locked position corresponds to a distalmost position of lock 126 relative to proximal end 35 of lock core 100.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A lock core for use with a key, the lock core comprising:

a shell;

a plug positioned within and rotatable relative to the shell between a first plug position and a second plug position about a longitudinal axis of the plug, the plug including a keyway adapted to receive the key; and a lock rotatable about a lock axis between a first position wherein a rotation of the plug is restricted by the lock and a second position wherein the plug is rotatable from the first plug position to the second plug position, the lock being rotatable within an envelope of the shell and the lock axis positioned outside of an envelope of the plug;

wherein the lock is rotatable from the second position to a third position wherein a rotation of the plug is restricted.

2. The lock core of claim 1, wherein the shell includes a passageway that receives the plug, and wherein the lock axis of the lock is positioned within the shell.

3. The lock core of claim 1, wherein the shell includes an upper region having a first cylindrical portion with a first maximum lateral extent, a lower region having a second cylindrical portion with a second maximum lateral extent, and a waist having a third maximum lateral extent, the third maximum lateral extent being less than the first maximum lateral extent and being less than the second maximum lateral extent.

4. The lock core of claim 1, wherein the lock axis of the lock is skewed relative to the longitudinal axis of the plug.

5. The lock core of claim 1, wherein a center plane of the lock intersects the longitudinal axis of the plug.

6. The lock core of claim 1, wherein the plug comprises a lock passage, and the lock is positioned in the lock passage.

7. The lock core of claim 6, further comprising a lock actuator positioned within the lock passage of the plug, the lock actuator comprising a rack and a spring longitudinally aligned with the rack, the rack comprising a receiver, one end of the spring is received by the receiver, and another end of the spring is received by the plug, and the spring provides a biasing force to bias the lock to the first position.

8. The lock core of claim 7, wherein a center plane of the lock intersects the rack.

9. The lock core of claim 7, wherein the lock actuator translates within the plug in a direction parallel to the longitudinal axis of the plug.

10. The lock core of claim 9, wherein translational movement of the lock actuator within the plug causes the lock to rotate about the lock axis.

11. The lock core of claim 10, wherein the lock rotates from the first position against the biasing force of the spring to the second position.

12. The lock core of claim 9, wherein the rack further comprises gear teeth, and the lock comprises a pinion that meshes with the gear teeth of the rack such that translation of the lock actuator causes the lock to rotate about the lock axis.

13. The lock core of claim 1, wherein the lock comprises a first end and a second end, and the shell comprises at least one lock receiver, and when the lock is in the second position, the first end and the second end of the lock are spaced apart from the at least one lock receiver.

14. The lock core of claim 1, wherein the lock comprises a first end and a second end, and the shell comprises at least one lock receiver, and when the lock is in the first position, the first end of the lock is received in the at least one lock receiver, and when the lock is in the third position, the second end of the lock is received in the at least one lock receiver.

15. The lock core of claim 1, wherein the lock core further comprises a front face, and when the lock is in the first position, the lock is in a proximalmost position relative to the front face, and when the lock is in the third position, the lock is in a distalmost position relative to the front face.

16. The lock core of claim 1, wherein the plug comprises an arcuate surface having a center of curvature, and the lock axis of the lock intersects the center of curvature.

17. The lock core of claim 16, wherein the lock comprises an arcuate blocker, and the arcuate blocker is supported by and rotates on the arcuate surface.

18. The lock core of claim 1, wherein, in the first position, a rotation of the plug to the second plug position is restricted.

19. A lock core for use with a key, the lock core comprising: a shell;

a plug positioned within and rotatable relative to the shell between a first plug position and a second plug position about a longitudinal axis of the plug, the plug including a keyway adapted to receive the key;

a blocker movable between a first position restricting rotation of the plug, a second position allowing rotation of the plug, and a third position restricting rotation of the plug; and a gear assembly positioned within the plug and configured to cause movement of the blocker between the first position, the second position, and the third position.

20. A lock core for use with a key, the lock core comprising:

a shell;

a plug positioned within and rotatable relative to the shell between a first plug position and a second plug position about a longitudinal axis of the plug, the plug including a keyway adapted to receive the key;

a lock rotatable about a lock axis between a first position wherein a rotation of the plug is restricted by the lock and a second position wherein the plug is rotatable from the first plug position to the second plug position, the lock being rotatable within an envelope of the shell and the lock axis positioned outside of an envelope of the plug; and a lock actuator positioned within the lock passage of the plug, the lock actuator comprising a rack and a spring longitudinally aligned with the rack, the rack comprising a receiver, one end of the spring is received by the receiver, and another end of the spring is received by the plug, and the spring provides a biasing force to bias the lock to the first position;

wherein the plug comprises a lock passage, and the lock is positioned in the lock passage.

21. The lock core of claim 20, wherein the lock actuator translates within the plug in a direction parallel to the longitudinal axis of the plug.

* * * * *